United States Patent
Ukita et al.

(10) Patent No.: US 9,246,602 B2
(45) Date of Patent: Jan. 26, 2016

(54) QUANTUM ENCRYPTION COMMUNICATION APPARATUS, QUANTUM ENCRYPTION COMMUNICATION METHOD, AND QUANTUM ENCRYPTION COMMUNICATION SYSTEM

(75) Inventors: Masakazu Ukita, Kanagawa (JP); Yohei Kawamoto, Tokyo (JP); Yu Tanaka, Tokyo (JP)

(73) Assignee: Sony Corporation, Tokyo (JP)

(*) Notice: Subject to any disclaimer, the term of this patent is extended or adjusted under 35 U.S.C. 154(b) by 257 days.

(21) Appl. No.: 13/238,092

(22) Filed: Sep. 21, 2011

(65) Prior Publication Data

US 2012/0087500 A1 Apr. 12, 2012

(30) Foreign Application Priority Data

Oct. 6, 2010 (JP) ................................ 2010-226628

(51) Int. Cl.
- *H04K 1/00* (2006.01)
- *H04B 10/70* (2013.01)
- *H04L 9/08* (2006.01)

(52) U.S. Cl.
CPC .............. *H04B 10/70* (2013.01); *H04L 9/0858* (2013.01); *H04L 9/0883* (2013.01)

(58) Field of Classification Search
CPC .............................. H04L 9/0883; H04B 10/70
USPC ........................................................ 380/256
See application file for complete search history.

(56) References Cited

U.S. PATENT DOCUMENTS

| | | | | |
|---|---|---|---|---|
| 4,904,085 A | * | 2/1990 | Spillman, Jr. et al. | 356/364 |
| 5,384,638 A | * | 1/1995 | Takahashi | G01R 15/22 356/491 |
| 5,658,490 A | * | 8/1997 | Sharp | G02F 1/13363 252/299.01 |
| 6,272,224 B1 | * | 8/2001 | Mazourenko | H04L 9/0858 380/256 |
| 6,421,131 B1 | * | 7/2002 | Miller | G01J 3/447 356/453 |
| 6,992,809 B1 | * | 1/2006 | Wang | G01J 3/2823 349/18 |
| 7,907,850 B2 | | 3/2011 | Tanaka et al. | |
| 2003/0122063 A1 | * | 7/2003 | Biyikli | 250/225 |
| 2003/0161567 A1 | * | 8/2003 | Baxter | G02B 6/29358 385/11 |
| 2004/0126048 A1 | * | 7/2004 | Dave | G01N 21/4795 385/11 |

(Continued)

FOREIGN PATENT DOCUMENTS

JP 3529699 3/2004
JP 3529700 3/2004

(Continued)

OTHER PUBLICATIONS

Lijun Ma, Alan Mink, and Xiao Tang, "High Speed Quantum Key Distribution Over Optical Fiber Network System", vol. 114, No. 3, May-Jun. 2009, pp. 149-177.*

(Continued)

*Primary Examiner* — Luu Pham
*Assistant Examiner* — Canh Le
(74) *Attorney, Agent, or Firm* — Sony Corporation

(57) ABSTRACT

Provided is a quantum encryption communication apparatus of a transmission side which performs a communication process based on quantum encryption, including: a light source unit which generates a light pulse; a polarization modulating unit which performs polarization modulation of the light pulse by using a variable wavelength plate; and a controller which drives the variable wavelength plate to convert a polarization state of the light pulse to one of a plurality of predetermined polarization bases at random.

13 Claims, 13 Drawing Sheets

(56) References Cited

U.S. PATENT DOCUMENTS

| | | | |
|---|---|---|---|
| 2004/0129867 A1* | 7/2004 | Mackey | 250/225 |
| 2004/0262499 A1* | 12/2004 | Martinelli et al. | 250/225 |
| 2007/0279556 A1* | 12/2007 | Wang et al. | 349/102 |
| 2009/0257106 A1* | 10/2009 | Tan et al. | 359/279 |
| 2009/0268901 A1* | 10/2009 | Lodewyck | H04L 9/0852 380/41 |
| 2010/0027794 A1* | 2/2010 | Yuan et al. | 380/255 |
| 2010/0039917 A1* | 2/2010 | Ide | 369/100 |
| 2010/0309469 A1* | 12/2010 | Kanter et al. | 356/364 |

FOREIGN PATENT DOCUMENTS

| | | |
|---|---|---|
| JP | 4015385 | 9/2007 |
| JP | 2007-286551 | 11/2007 |

OTHER PUBLICATIONS

Francois Goudail et al. "Target detection with a liquid-crystal-based passive Stokes polarimeter," Applied Optics, vol. 43, No. 2, January pp. 274-282.*

Xiao Tang et al. "Quantum key distribution system operating at sifted-key rate over 4 Mbit/s," Proc. of SPIE Vo. 6244 62440P-1, pp. 1-8.*

Mehrdad S. Sharbaf "Quantum Cryptography: A new generation of Information Technology Security System," 2009 Sixth Inernational Conference on Information Technology: New Generations, pp. 1644-1648.*

Ryutaroh Matsumoto, "Secret key can be obtained from both compatible and incompatible measurements in the six-state QKD protocol", IEICE Technical Report IT2007-43, ISEC2007-14-WBS2007-74, Feb. 2008, pp. 73-75.

* cited by examiner

QUANTUM ENCRYPTION COMMUNICATION APPARATUS, QUANTUM ENCRYPTION COMMUNICATION METHOD, AND QUANTUM ENCRYPTION COMMUNICATION SYSTEM

BACKGROUND

The present disclosure relates to a quantum encryption communication apparatus, a quantum encryption communication method, and a quantum encryption communication system, and more particularly, to a miniaturized quantum encryption communication apparatus performing quantum encryption communication, which is capable of being mounted on a portable electronic apparatus or the like.

In the related art, in a communication performed in the Internet or the like, security has been kept by an encryption technique. The encryption systems are mainly divided into two encryption systems of a common key encryption system and a public key encryption system. For example, at present, AES (Advanced Encryption Standard) or the like has been widely used as the common key encryption system, and RSA or the like has been widely used as the public key encryption system.

In the common key encryption system, two parties that perform communication retain a common secret key. A transmitter encrypts a plaintext by using the secret key to generate a ciphertext, and a receiver decodes the ciphertext by using the same secret key to obtain the original plaintext.

In the common key encryption system, the important factor in the retaining of security is to keep the secret of the key. In the common key encryption system, if so-called "brute-force attack" which searches for the key by the brute-force is made, the key is revealed with a high probability. In the common key encryption system which is used at present, it is estimated that an impractically large amount of resources (performance of computation or an amount of computation) for making the brute-force attack would be necessary. Therefore, at present, it may be considered that the common key encryption system is safe. However, in the future, it may be predicted that the brute-force attack is a practical attack due to improvement in the performance of computers or the like. In fact, it is recommended that a method called 2-key TDES (Triple DES) which has been used in the related art be replaced by the AES.

With respect to an attack including the brute-force attack, the security is reinforced by using a method of frequently updating the common key. In other words, although an attacker eavesdrops on the communication and acquires a key, if the key is frequently updated, the amount of the ciphertext which may be deciphered with the key is reduced, so that the overall amount of the information which is acquired by the attacker is relatively lowered.

As one of the methods of frequently updating the common key, as disclosed in Japanese Patent No. 4015385, a method of performing quantum key distribution (QKD: Quantum Key Distribution) by using quantum encryption communication is proposed. The quantum key distribution is a protocol which generates a common secret key between the two parties which are connected by a communication line which may transmit quantum state and a general communication line. The protocol is based on quantum mechanical principles. Therefore, although an attacker eavesdrops on the communication line, it is considered that the information on the generated secret key is not leaked to the attacker. If the quantum key distribution protocol is used, the secret key may be safely shared by the two parties which are separated from each other, and the key may be generated at any time by using the quantum key distribution protocol, so that the aforementioned updating of the common key may be frequently performed. In this manner, by combining the quantum key distribution and the common key encryption, it is possible to reinforce the security of the common key encryption system.

In the quantum key distribution, for example, the BB84 protocol or the 6-state type protocol as an extension of the B84 protocol disclosed in "Secret key can be obtained from both compatible and incompatible measurements in the six-state QKD protocol" (Matsumoto Ryutaro, IEICE Technical Report IT2007-43, ISEC20070140, WBS2007-74 (2008-02)) has been used. In addition, as disclosed in Japanese Unexamined Patent Application Publication No 2007-286551, a decoy method is used where the intensity modulation of the light pulse is performed, so that it is possible to further increase the encrypted intensity of the quantum key distribution.

SUMMARY

However, in the quantum encryption communication of the related art, since a phase modulator or the like is used for the long-distance communication using an optical cable, the communication apparatus is configured to have a large size. For example, since the communication apparatus has a size such that the communication apparatus is contained in a rack, it is difficult to adapt the communication apparatus to a portable electronic apparatus, for example, a mobile phone, a PDA, a tablet type PC, an electronic book reader, a notebook type PC, or the like.

It is desirable to provide a quantum encryption communication apparatus capable of being embedded in a portable electronic apparatus or the like and performing quantum encryption communication, a quantum encryption communication method, and a quantum encryption communication system.

According to a first embodiment of the present disclosure, there is provided a quantum encryption communication apparatus of a transmission side which performs a communication process based on quantum encryption, including: a light source unit which generates a light pulse; a polarization modulating unit which performs polarization modulation of the light pulse by using a variable wavelength plate; and a controller which drives the variable wavelength plate to convert a polarization state of the light pulse to one of a plurality of predetermined polarization bases at random.

In embodiment of the present disclosure, the light pulse is generated by the light source unit which is configured by using, for example, a semiconductor light-emitting device. In the polarization modulating unit, the polarization modulation of the light pulse is performed by using the liquid crystal retarder as the variable wavelength plate. The controller drives the liquid crystal retarder to convert the polarization state of the light pulse to one of a plurality of the predetermined polarization bases. In this manner, the quantum encryption communication apparatus of the transmission side outputs the polarization-modulated light pulse. In addition, the polarizer is integrally disposed in the light pulse incidence surface side of the liquid crystal retarder. In addition, the second liquid crystal retarder of which the optical axis is tilted by 45 degrees with respect to the optical axis of the liquid crystal retarder is disposed in the emitting surface side of the liquid crystal retarder, and the two liquid crystal retarders are driven by the controller, so that the quantum encryption communication using a 6-state type protocol is performed. In addition, the intensity modulator, for example, the intensity modulator which is configured with the liquid crystal retarder and the polarizer is disposed between the polarizer and the liquid crystal retarder to perform the conversion of the intensity of the light pulse, so that the quantum encryption communication is performed.

According to a second embodiment of the present disclosure, there is provided a quantum encryption communication method of a quantum encryption communication apparatus of a transmission side which performs a communication process based on quantum encryption, including: allowing a light source unit to generate a light pulse; performing polarization modulation of the light pulse by using a variable wavelength plate; allowing a controller to drive the variable wavelength plate to convert a polarization state of the light pulse to one of a plurality of predetermined polarization bases at random.

According to a third embodiment of the present disclosure, there is provided a quantum encryption communication system which performs a communication process based on quantum encryption, wherein a quantum encryption communication apparatus of a transmission side includes: a light source unit which generates a light pulse; a polarization modulating unit which performs polarization modulation of the light pulse by using a variable wavelength plate and emits the polarization-modulated light pulse to a communication line; a controller which drives the variable wavelength plate to convert a polarization state of the light pulse to one of a plurality of predetermined polarization bases at random, and wherein a quantum encryption communication apparatus of a reception side includes: an optical unit which distributes the light pulse emitted from the quantum encryption communication terminal of the transmission side to each polarization basis; and a light-receiving unit which detects the light pulse, which is distributed to each of the polarization bases, with respect to each of the polarization bases.

According to the present disclosure, it is possible to convert a polarization state of a light pulse generated by a light source unit to one of a plurality of predetermined polarization bases at random by using a variable wavelength plate, for example, a liquid crystal retarder. Therefore, since a polarization-modulated light pulse may be emitted from a transmission side to a reception side by using a simple configuration, it is possible to miniaturize a quantum encryption communication apparatus or system.

DETAILED DESCRIPTION OF EMBODIMENTS

Hereinafter, embodiments of the present disclosure will be described. In addition, the description is made in the following order.

1. Overall Configuration of Quantum Encryption Communication System
2. First Embodiment
3. Second Embodiment
4. Third Embodiment
5. Fourth Embodiment
6. Fifth Embodiment <1. Overall Configuration and Operations of Quantum Encryption Communication System>

Figure 1:
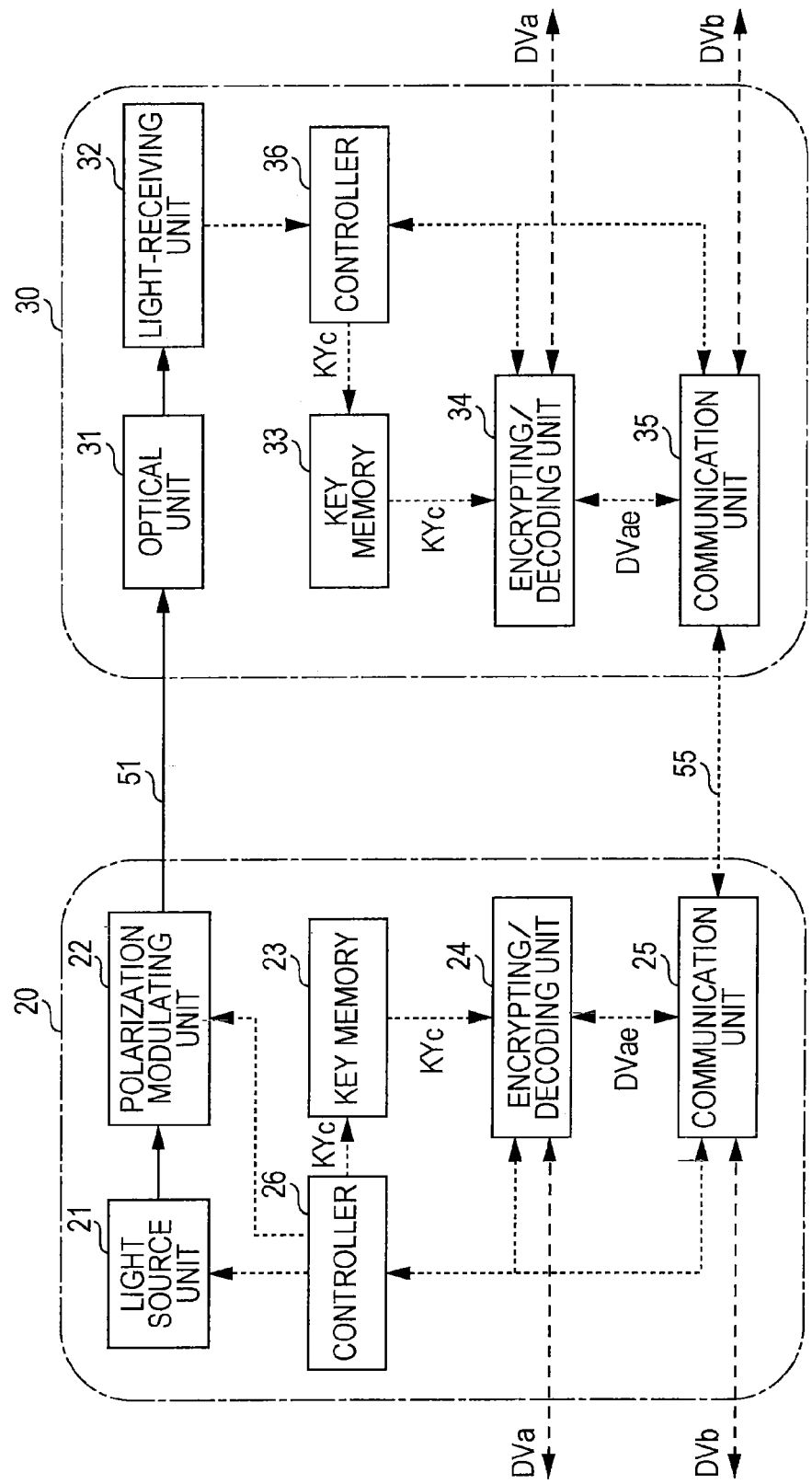
FIG. 1 is a diagram illustrating an overall configuration of a quantum encryption communication system.

FIG. 1 is a diagram illustrating an overall configuration of a quantum encryption communication system. The quantum encryption communication system 10 includes a transmission side quantum encryption communication apparatus (hereinafter, referred to as a "transmission side communication apparatus") 20 and a reception side quantum encryption communication apparatus (hereinafter, referred to as a "reception side communication apparatus") 30. The transmission side communication apparatus 20 and the reception side communication apparatus 30 are connected to each other through a quantum communication line 51 and a classical communication line 55.

The transmission side communication apparatus 20 includes a light source unit 21, a polarization modulating unit 22, a key memory 23, an encrypting/decoding unit 24, a communication unit 25, and a controller 26.

The light source unit 21 is configured with a semiconductor light-emitting device such as a laser diode or an LED, a lens which collimates a light pulse emitted from the semiconductor light-emitting device, and the like. The light emission of the light source unit 21 is controlled by the controller 26.

The polarization modulating unit 22 converts the polarization state of the light pulse emitted from the light source unit 21 to one of a plurality of predetermined polarization bases. The polarization modulating unit 22 is configured by using a variable wavelength plate, for example, a liquid crystal retarder. The polarization modulating unit 22 performs polarization modulation based on the control signal of the controller 26, converts the polarization state of the light pulse emitted from the light source unit 21 to one of a plurality of the predetermined polarization bases at a high speed based on the control signal, and emits the light pulse through the quantum communication line 51 to the reception side communication apparatus 30.

The key memory 23 stores the common key KYc generated by the controller 26. In addition, the encrypting/decoding unit 24 encrypts a communication text DVa using encryption or decodes an encrypted communication text DVae by using the common key KYc stored in the key memory 23.

The communication unit 25 transmits a communication text DVb which is not encrypted or the communication text DVae encrypted by the encrypting/decoding unit 24 through the classical communication line 55 to the reception side communication apparatus 30. In addition, the communication unit 25 receives the communication text transmitted from the reception side communication apparatus 30 through the classical communication line 55. In the case where the received communication text is not encrypted, the communication unit 25 supplies the received communication text DVb to a signal processing unit (not shown). In addition, in the case where the received communication text is encrypted, the communication unit 25 supplies the received communication text DVae to the encrypting/decoding unit 24. Therefore, the decoded communication text DVa is supplied from the encrypting/decoding unit 24 to the signal processing unit.

In order to perform the quantum encryption communication, the controller 26 controls the emission of the light pulse from the light source unit 21 or controls the polarization modulation which the polarization modulating unit 22 performs on the emitted light pulse. In addition, the controller 26 performs communication with the reception side communication apparatus 30 through the communication unit 25 or the classical communication line 55 and performs a process of generating the common key from the communication result of the quantum encryption communication, communication control of the communication text, control of encrypting or decoding using the common key, or the like.

The reception side communication apparatus 30 includes an optical unit 31, a light-receiving unit 32, a key memory 33, an encrypting/decoding unit 34, a communication unit 35, and a controller 36.

The optical unit 31 distributes the polarization-modulated light pulse, which is supplied from the transmission side communication apparatus 20 through the quantum communication line 51, to the polarization bases. The light-receiving unit 32 detects the light pulse, which is distributed to each of the polarization bases, with respect to each of the polarization bases and outputs the detection result to the controller 36.

The key memory 33 stores the common key KYc which is generated based on the detection result from the light-receiving unit 32 by the controller 36. In addition, the encrypting/decoding unit 34 encrypts the communication text DVa using encryption or decodes the encrypted communication text DVae by using the common key KYc stored in the key memory 33.

The communication unit 35 transmits the communication text DVb which is not encrypted or the communication text DVae encrypted by the encrypting/decoding unit 34 through the classical communication line 55 to the transmission side communication apparatus 20. In addition, the communication unit 35 receives the communication text transmitted from the transmission side communication apparatus 20 through the classical communication line 55. In the case where Lire received communication text is not encrypted, the communication unit 35 supplies the received communication text DVb to a signal processing unit (not shown). In addition, in the case where the received communication text is encrypted, the communication unit 35 supplies the received communication text DVae to the encrypting/decoding unit 34. Therefore, the decoded communication text DVa is supplied from the encrypting/decoding unit 34 to the signal processing unit.

The controller 36 performs communication with the transmission side communication apparatus 20 through the communication unit 35 or the classical communication line 55 by using the detection result of the light-receiving unit 32 and performs a process of generating the common key from the communication result of the quantum encryption communication, communication control of the communication text, and controls encrypting or decoding using the common key.

In the quantum encryption communication system having this configuration, a random number is independently generated by the controller 26 of the transmission side communication apparatus 20; the generated random number is supplied to the polarization modulating unit 22; and the polarization modulation of the optical signal passing through the quantum communication line 51 is performed. In addition, the controller 36 of the reception side communication apparatus 30 generates a receiving signal based on the light reception result of the light-receiving unit 32, performs error correction, privacy amplification, or the like on the receiving signal, and performs generating or updating the common key which is common to the transmission side communication apparatus 20 and the reception side communication apparatus 30. In addition, the controller 36 stores the common key in the key memories 23 and 33.

<2. First Embodiment>

In a first embodiment, the quantum key distribution is performed by using a light pulse propagating through a free space according to the BB84 protocol using the four types of polarization states including the two types of linear polarizations and the two types of circular polarizations.

<2-1. Configuration of First Embodiment>

Figure 2:
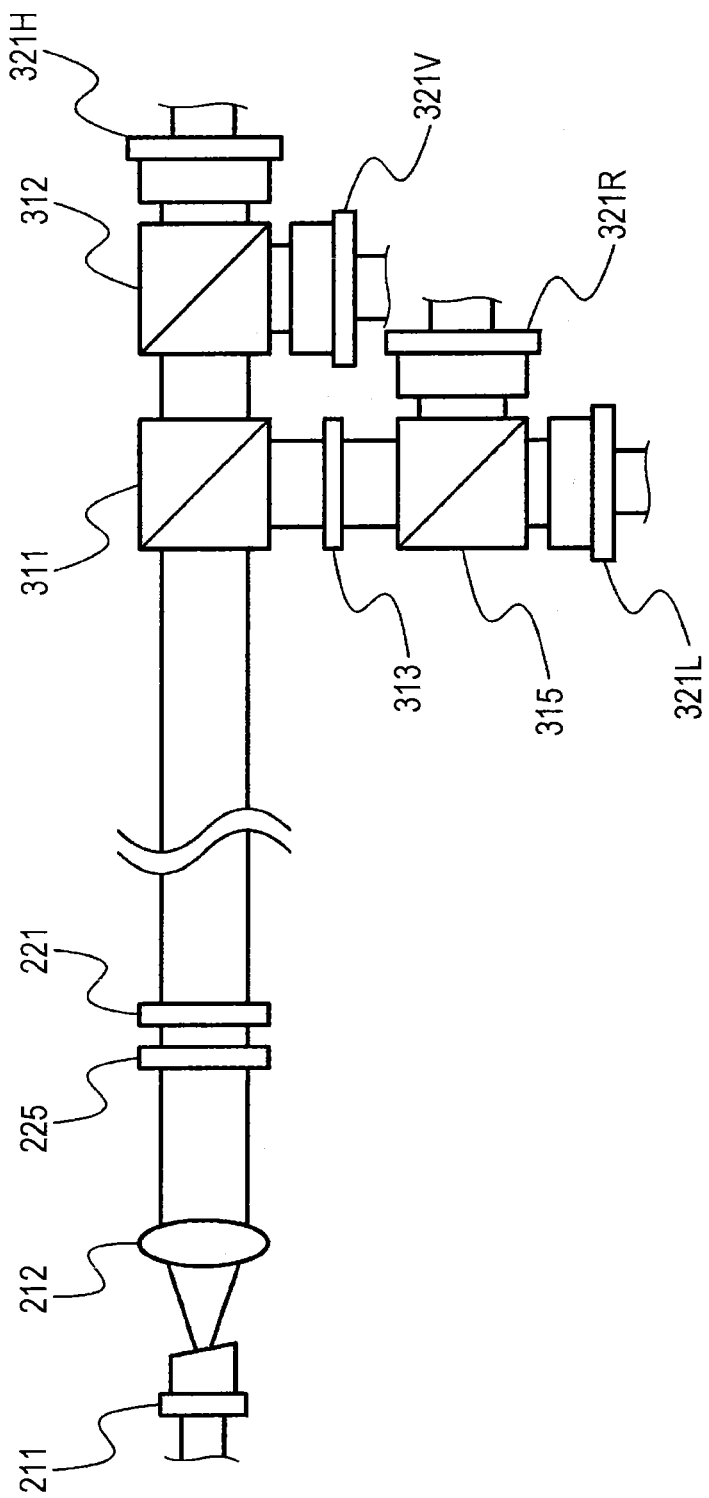
FIG. 2 is a diagram illustrating a configuration according to a first embodiment of the present disclosure.

FIG. 2 illustrates a configuration of the first embodiment of the present disclosure. In addition, FIG. 2 illustrates the configuration of the light source unit 21, the polarization modulating unit 22, the optical unit 31, and the light-receiving unit 32 illustrated in FIG. 1.

The light source unit 21 of the transmission side communication apparatus 20 is configured by using a semiconductor light-emitting device 211 such as a laser diode or an LED, a lens 212 which collimates a light pulse emitted from the semiconductor light-emitting device 211.

A liquid crystal retarder 221 which converts the polarization state of the collimated light pulse to one of the four types of polarization states is used in the polarization modulating unit 22. The liquid crystal retarder 221 is disposed so that the optical axis is tilted by 45 degrees with respect to the direction of the linear polarization of the light pulse emitted from the light source unit 21. The liquid crystal retarder 221 changes the phase difference occurring in the polarization components along the FAST axis and the SLOW axis according to the control signal of the controller 26.

In addition, in the polarization modulating unit 22, in the case where the light emitted from the light source unit 21 is not the linear polarization or the case where it is difficult to accurately control the polarization direction with respect to the optical axis of the liquid crystal retarder 221 although the light is the linear polarization, a polarizer 225 is disposed in the light pulse incidence surface side of the liquid crystal retarder 221. For example, the polarizer 225 is integrated with the liquid crystal retarder 221 in the light pulse incidence surface side of the liquid crystal retarder 221 so that the optical axis of the liquid crystal retarder 221 is set to be tilted by 45 degrees with respect to the linear polarization emitted from the polarizer 225. According to this configuration of the polarization modulating unit 22, although the position of the polarization modulating unit 22 is not accurately controlled with respect to the light source unit 21, it is possible to set the polarization direction and the optical axis of the liquid crystal retarder 221 at a desired angle.

The optical unit 31 of the reception side communication apparatus 30 includes a non-polarization beam splitter 311, polarization beam splitters 312 and 315, and a ¼ wavelength plate 313. The non-polarization beam splitter 311 performs division without a change in the polarization state of the light pulse emitted from the transmission side communication apparatus 20. The polarization beam splitter 312 performs polarization separation on the one of the light pulses split by the non-polarization beam splitter 311. With respect to the polarization state of the other light pulse spilt by the non-polarization beam splitter 311 the ¼ wavelength plate 313 converts the linear polarization to the circular polarization and converts the circular polarization to the linear polarization. The polarization beam splitter 315 performs polarization separation on the light pulse of which the polarization state is changed by the ¼ wavelength plate 313.

The light-receiving unit 32 includes light-receiving devices 321H, 321V, 321R, and 321L. The light-receiving device 321H detects the one light pulse which is polarization-split by the polarization beam splitter 312, and the light-receiving device 321V detects the other light pulse which is polarization-split by the polarization beam splitter 312. Similarly, the light-receiving device 321R detects the one light pulse which is polarization-split by the polarization beam splitter 315, and the light-receiving device 321L detects the other light pulse which is polarization-split by the polarization beam splitter 315.

<2-2. Operations of First Embodiment>
[Quantum Communication Operation]

With respect to the quantum communication of the BB84 protocol, the transmission side communication apparatus 20 performs the following operations.

The controller 26 drives the semiconductor light-emitting device 211 of the light source unit 21 by the pulse current to generate the light pulse. At this time, it is preferable that the number of photons per pulse be one or less (in the case where the intensity of the light pulse from the semiconductor light-emitting device 211 is strong, the number of photons per pulse may be set to be one or less by using a photo-sensing unit (not shown in this figure) such as an ND filter).

The light pulse generated by the light source unit 21 is incident on the liquid crystal retarder 221 of the polarization modulating unit 22. In addition, in the case where the polarizer 225 is installed, the light pulse is incident through the polarizer 225 on the liquid crystal retarder 221.

The liquid crystal retarder 221 is controlled by the controller 26 at random so that the phase difference φ occurring in the polarization components along the FAST axis and the SLOW axis is one of 0 degrees, 90 degrees, 180 degrees, and 270 degrees according to the arrival timing of the light pulse.

With respect to the polarization state of the light pulse passing through the liquid crystal retarder 221, in the case where the phase difference φ is 0 degrees, the polarization state is the linear polarization of the incidence time without a change; in the case where the phase difference φ is 180 degrees, the polarization state is changed to the linear polarization perpendicular to the incident linear polarization; and in the case where the phase difference φ is 90 degrees or 270 degrees, the polarization states are changed to the circular polarizations which are different from each other in the direction. In addition, in the case where the phase difference φ is 90 degrees or 270 degrees, whether the polarization states are the left-handed circular polarization and the right-handed circular polarization or the right-handed circular polarization and the left-handed circular polarization is determined according to, the directions of the optical axes (the SLOW axis and the FAST axis) of the disposed liquid crystal retarder.

Figure 3:
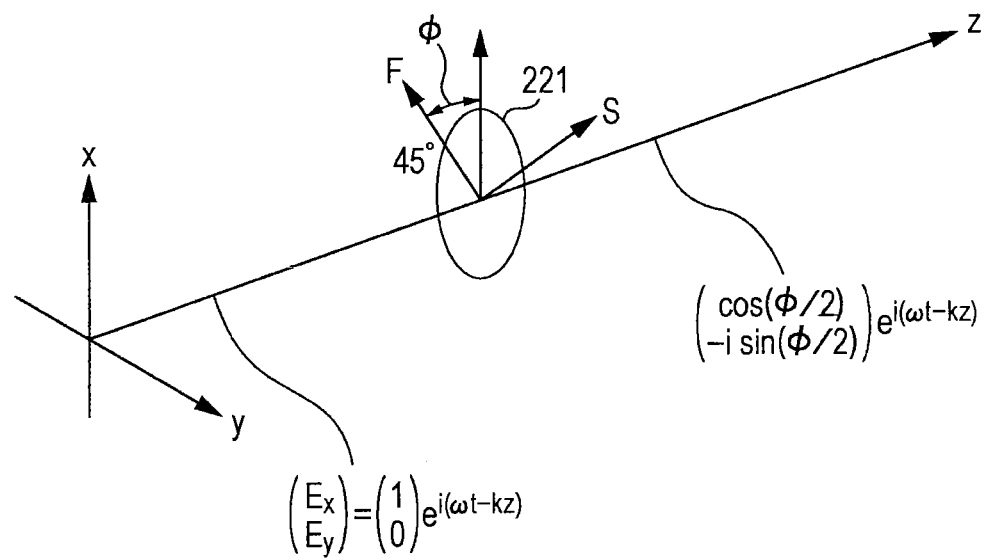
FIG. 3 is a diagram illustrating polarization modulation performed by a liquid crystal retarder.

FIG. 3 illustrates the polarization modulation performed by the liquid crystal retarder 221. The linear polarization in the x direction illustrated in FIG. 3 is set to the vertical polarization. In addition, the FAST axis of the liquid crystal retarder 221 is set to the position tilted by 45 degrees with respect to the x-direction axis. In addition, the FAST axis of the liquid crystal retarder 221 is indicated by "F", and the SLOW axis thereof is indicated by "S".

In this case, if the phase difference φ occurring in the polarization components along the FAST axis and the SLOW axis of the liquid crystal retarder 221 is set to 0 degrees, the light pulse passing through the liquid crystal retarder 221 becomes the vertical polarization. In addition, in the case where the phase difference φ is set to 90 degrees, the light pulse becomes the left-handed circular polarization; in the case where the phase difference φ is set to 180 degrees, the light pulse becomes the horizontal polarization; and in the case where the phase difference φ is set to 270 degrees, the light pulse becomes the right-handed circular polarization.

In this manner, the light pulse of which the polarization state is controlled to be one of the four polarization states at random by the controller 26 is output from the transmission side communication apparatus 20.

The reception side communication apparatus 30 allows the non-polarization beam splitter 311 of the optical unit 31 to divide the light pulse emitted from the transmission side communication apparatus 20. The one of the light pulses split by the non-polarization beam splitter 311 is incident on the polarization beam splitter 312, divided into the polarization components, and incident on the light-receiving device 321H or the light-receiving device 321V.

The other of the light pulses split by the non-polarization beam splitter 311 passes through the ¼ wavelength plate 313 to allow the polarization state to be changed, and after that, incident on the polarization beam splitter 315, divided into the polarization components, and incident on the light-receiving device 321R or the light-receiving device 321L. In addition, in the above description, although it is disclosed that the light pulse is split, in an actual case (herein, it is assumed that there is no noise), it is not necessary that one light pulse is detected by all the light-receiving devices. This is because the intensity of the light pulse is set so that the number of photons per pulse is one or less, and thus, the photons are detected by one of the four light-receiving devices to be converted to an electrical signal.

Table 1 lists the light pulse detection probability of the light-receiving device of each polarization state. In addition, Table 1 list the values of an ideal case where the number of photons per pulse is "1", the splitting ratio of the non-polarization beam splitter 311 is p:(1-p) (herein, 0<p<1), and there is neither optical loss nor eavesdropping.

TABLE 1

|  |  | Light-Receiving Device 321 | | | |
| --- | --- | --- | --- | --- | --- |
|  |  | V | H | L | R |
| Polarization | V | p | 0 | 0.5 (1 − p) | 0.5 (1 − p) |
| State of | H | 0 | p | 0.5 (1 − p) | 0.5 (1 − p) |
| Transmitted | L | 0.5 p | 0.5 p | (1 − p) | 0 |
| Light Pulse | R | 0.5 p | 0.5 p | 0 | (1 − p) |

In the case where the light pulse which is the vertical polarization V or the horizontal polarization H is turned toward the light-receiving device 321H or the light-receiving device 321V by the non-polarization beam splitter 311, the probability thereof is "p", and the light pulses are detected by the corresponding light-receiving devices. In other words, in the case where the light pulse is the vertical polarization V, the probability that the light pulse is detected by the light-receiving device 321V becomes "p", p and the probability that the light pulse is detected by the light-receiving device 321H becomes "0". In addition, in the case where the light pulse is the horizontal polarization H, the probability that the light pulse is detected by the light-receiving device 321V becomes "0", and the probability that the light pulse is detected by the light-receiving device 321H becomes "p".

In addition, in the case where the light pulse which is the vertical polarization V or the horizontal polarization H is turned toward the light-receiving device 321L or the light-receiving device 321R by the non-polarization beam splitter 311, the probability thereof is "1-p". In addition, since all the light pulses are detected with the equal probability of "0.5" by the light-receiving devices, the probability that the light pulse is detected by the light-receiving devices 321L and 321R becomes the probability of "0.5(1-p)" in the case where the light pulse is any one of the vertical polarization V and the horizontal polarization H.

Similarly, in the case where the light pulse is the left-handed circular polarization L, the probability that the light pulse is detected by the light-receiving device 321L becomes "1-p", and the probability that the light pulse is detected by the light-receiving device 321R becomes "0". In addition, in the case where the light pulse is the right-handed circular polarization R, the probability that the light pulse is detected by the light-receiving device 321L becomes "0", and the probability that the light pulse is detected by the light-receiving device 321R becomes "1-p". In addition, the probability that the light pulse is detected by the light-receiving devices 321V and 321H becomes the probability of "0.5p" in the case where the light pulse is any one of the left-handed circular polarization L and the right-handed circular polarization R. In the BB84 protocol, the portion which performs the quantum communication outputs the light reception results of the light-receiving devices 321V, 321H, 321L, and 321R to the controller 36 by repetitively performing the operations described hereinbefore.

[Classical Communication Operation]

Next, after the quantum communication of the BB84 protocol, the classical communication is performed. The transmission side communication apparatus 20 and the reception side communication apparatus 30 perform the protocol described hereinafter by using the public communication line (that is, the communication details are not encrypted but all the communication details may be recognized by an eavesdropper).

(1) Basis Exchange

The reception side communication apparatus 30 communicates with the transmission side communication apparatus 20 through the public communication line, for example, the classical communication line 55 to transmit only the information indicating whether the linear polarization is detected or the circular polarization is detected among the reception results of the quantum communication from the controller 36 through the communication unit 35 and the communication unit 25 of the transmission side communication apparatus 20 to the controller 26. For example, in the case where the vertical polarization V is detected, the information indicating "the vertical polarization V is detected" is not transmitted, but only the information indicating "the linear polarization is detected" is transmitted. The controller 26 of the transmission side communication apparatus 20 detects which reception result of which time point is correct among the reception results and notifies the detection result to the controller 36 of the reception side communication apparatus 30. The controller 36 of the reception side communication apparatus 30 selects only the correct data based on the notified detection result. In other words, in the case where the transmission side communication apparatus 20 transmits the light pulse which is the linear polarization (the vertical polarization V or the horizontal polarization H) and the reception side communication apparatus 30 detects the circular polarization (the left-handed circular polarization L or the right-handed circular polarization R), the shared secret information may not be generated. In addition, in the case where the transmission side communication apparatus 20 transmits the light pulse which is the circular polarization (L or R) and the reception side communication apparatus 30 detects the linear polarization (V or H), the shared secret information may not be generated. Therefore, the data are discarded. In addition, from the remaining data, for example, in the case of the linear polarization, if the vertical polarization V is set to "0" and the horizontal polarization H is set to "1" and in the case of the circular polarization, if the left-handed circular polarization L is set to "0" and the right-handed circular polarization R is set to "1", the correlated random bit sequence may be shared by the transmitting apparatus and the receiving apparatus. The common key is generated based on the random bit sequence by the transmission side communication apparatus 20 and the reception side communication apparatus 30.

In addition, on the contrary, the transmission side communication apparatus 20 may transmit only the information indicating "whether the linear polarization is transmitted or the circular polarization is transmitted" from the controller 26 through the communication unit 25 and the communication unit 35 of the transmission side communication apparatus 30 to the controller 36, and the controller 36 of the reception side communication apparatus 30 may select only the correct data based on the notified basis.

However, in some cases, the bit sequence shared by the transmission side communication apparatus and the reception side communication apparatus may include an error caused by the quantum communication line 51 or an error occurring during the transmission and the reception. In addition, in the case where an eavesdropper who exists on the quantum communication line 51 taps into the photon information, an error occurs in the shared bit sequence. Therefore, the estimation of the error rate, the error correction, or the privacy amplification is performed.

(2) Estimation of Error Rate

In the estimation of the error rate, in the case where the transmission side communication apparatus 20 transmits the light pulse which is the linear polarization (V or H) and the reception side communication apparatus 30 detects the linear polarization (V or H) and the case where the transmission side communication apparatus 20 transmits the light pulse which is the circular polarization (L or R) and the reception side communication apparatus 30 detects the circular polarization (L or R), about a half of the data are selected at random among the bit sequence obtained through the basis exchange. In addition, the error rate is estimated by combining the values of the data selected at random. In addition, the data used for the estimation of the error rate are removed from the bit sequence.

(3) Error Correction

In the error correction, the error correction is performed on the bit sequence where the data used for the estimation of the error rate are removed. For example, in the error correction, the bit sequence is divided into a plurality of blocks, and a block including an error is specified by checking the parity of each block, and the error correction is performed by applying a humming code or the like to the associated block.

(4) Privacy Amplification

In the privacy amplification, the privacy amplification is performed on the error-corrected bit sequence according to the estimated error rate. At this time, although an eavesdropper does not exist, an error may occur by the influence of noise in the transmission side communication apparatus 20, the reception side communication apparatus 30, or the quantum communication line. However, in order to increase the safety, it is assumed that all errors are originated from eavesdropping. In other words, under the assumption that an error occurs due to eavesdropping, the amount of information leaked to the eavesdropper is estimated from the error rate, and the conversion for reducing the bit sequence by the amount of information is performed. With respect to the reduced bit sequence, the amount of information of the eavesdropper may be neglected.

By performing this process, for example, if the error rate is small (for example, equal to or smaller than about 11% in the case of BB84), it is possible to obtain the bit sequence of which the length is longer than 1. The obtained bit sequence is stored as the common key in the key memory 23 of the transmission side communication apparatus 20 and the key memory 33 of the reception side communication apparatus 30. In the case where the error rate is large and the length of the bit sequence becomes zero, the key distribution fails.

In addition, in the above description, for the better understanding, it is described that the quantum communication portion and the classical communication portion are sequentially performed. However, actually, it is preferable that the quantum communication portion be continuously performed and, when some degrees of the data are stored, the classical communication portion be intermittently performed at any necessary time. This is because the amount of the common key which may be acquired per unit time is increased.

The common key stored in the transmission side communication apparatus 20 and the reception side communication apparatus 30 is used at any time when encryption of communication is necessary. For example, when the encryption communication is performed by using the common key encryption system, the amount of plaintext which is encrypted by using one common key is determined in advance. Herein, if the communication amount exceeds the determined communication amount, the transmission side communication apparatus and the reception side communication apparatus simultaneously extract the common key from the key memories and update the key used for the common key encryption system. In addition, if the communication amount is almost constant but it not greatly changed, the transmission side communication apparatus 20 and the reception side communication apparatus 30 simultaneously extract the common key from the key memories at every predetermined time interval and update the key used for the common key encryption system.

In this manner, since the transmission side communication apparatus 20 is configured so that the polarization modulating unit is configured by using the variable wavelength plate, for example, a liquid crystal retarder, it is possible to easily miniaturize the communication apparatus and to mount it on a portable electronic apparatus or the like in comparison with a communication apparatus using a phase modulator or the like in a quantum encryption communication in the related art.

In addition, the polarizer is disposed to be integrated with the liquid crystal retarder in the incidence surface side of the liquid crystal retarder so that the optical axis of the liquid crystal retarder is tilted by 45 degrees with respect to the linear polarization emitted from the polarizer. Therefore, although the position of the polarization modulating unit is not accurately controlled with respect to the light source unit, it is possible to set the polarization direction and the optical axis of the liquid crystal retarder at a desired angle.

<3. Second Embodimen>

In a second embodiment, the quantum key distribution is performed by using a light pulse propagating through a free space according to the BB84 protocol using the polarization states of the four types of linear polarizations. <3-1. Configuration of Second Embodiment>

Figure 4:
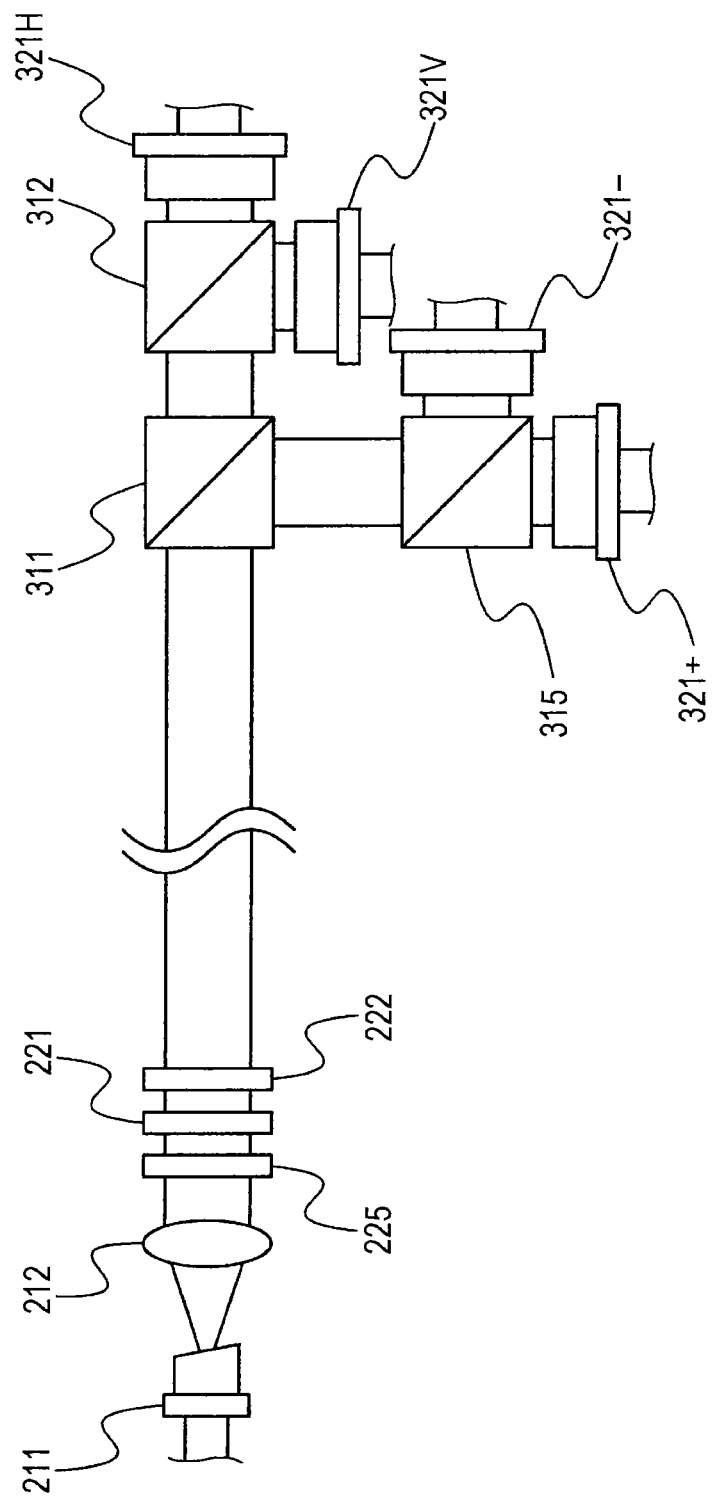
FIG. 4 is a diagram illustrating a configuration according to a second embodiment of the present disclosure.

FIG. 4 illustrates a configuration of the second embodiment. In addition, FIG. 4 illustrates the configuration of the light source unit 21, the polarization modulating unit 22, the optical unit 31, and the light-receiving unit 32 illustrated in FIG. 1.

The light source unit 21 of the transmission side communication apparatus 20 is configured by using a semiconductor light-emitting device 211 such as a laser diode or an LED and a lens 212 which collimates a light pulse emitted from the semiconductor light-emitting device 211.

The polarization modulating unit 22 includes a liquid crystal retarder 221 which converts the polarization state of the collimated light pulse to one of the four types of polarization states. The liquid crystal retarder 221 is disposed so that the optical axis is tilted by 45 degrees with respect to the direction of the linear polarization of the light pulse emitted from the light source unit 21. The liquid crystal retarder 221 changes the phase difference occurring in the polarization components along the FAST axis and the SLOW axis according to the control signal of the controller 26.

The ¼ wavelength plate 222 is disposed in the light pulse emitting surface side of the liquid crystal retarder 221 so as to be tilted by 45 degrees with respect to the optical axis of the liquid crystal retarder 221. In the case where the incident light pulse is a linear polarization, the ¼ wavelength plate 222 emits the linear polarization without a change. In addition, in the case where the incident light pulse is the circular polarization, the ¼ wavelength plate 222 emits the changed linear polarization which is tilted by 45 degrees with respect to the linear polarization of the case where the incident light pulse is the linear polarization.

In addition, in the polarization modulating unit 22, in the case where the light emitted from the light source unit 21 is not a linear polarization, or the case where it is difficult to accurately control the polarization direction with respect to the optical axis of the liquid crystal retarder 221 although the light is the linear polarization, a polarizer 225 is disposed in the light pulse incidence surface side of the liquid crystal retarder 221. For example, the polarizer 225 is integrated with the liquid crystal retarder 221 in the light pulse incidence surface side of the liquid crystal retarder 221 so that the optical axis of the liquid crystal retarder 221 is set to be tilted by 45 degrees with respect to the linear polarization emitted from the polarizer 225. According to this configuration of the polarization modulating unit 22, although the position of the polarization modulating unit 22 is not accurately controlled with respect to the light source unit 21, it is possible to set the polarization direction and the optical axis of the liquid crystal retarder 221 at a desired angle.

The optical unit 31 of the reception side communication apparatus 30 includes a non-polarization beam splitter 311, and polarization beam splitters 312 and 315. The non-polarization beam splitter 311 performs division without a change in the polarization state of the light pulse emitted from the transmission side communication apparatus 20. The polarization beam splitter 312 performs polarization separation on the one of the light pulses split by the non-polarization beam splitter 311. The polarization beam splitter 315 is installed, for example, so as to be rotated by 45 degrees around the optical axis of the incident light with respect to the surface where the polarization beam splitter 312 is installed, so that the other of the light pulses split by the non-polarization beam splitter 311 is polarization-separated.

Figure 5:
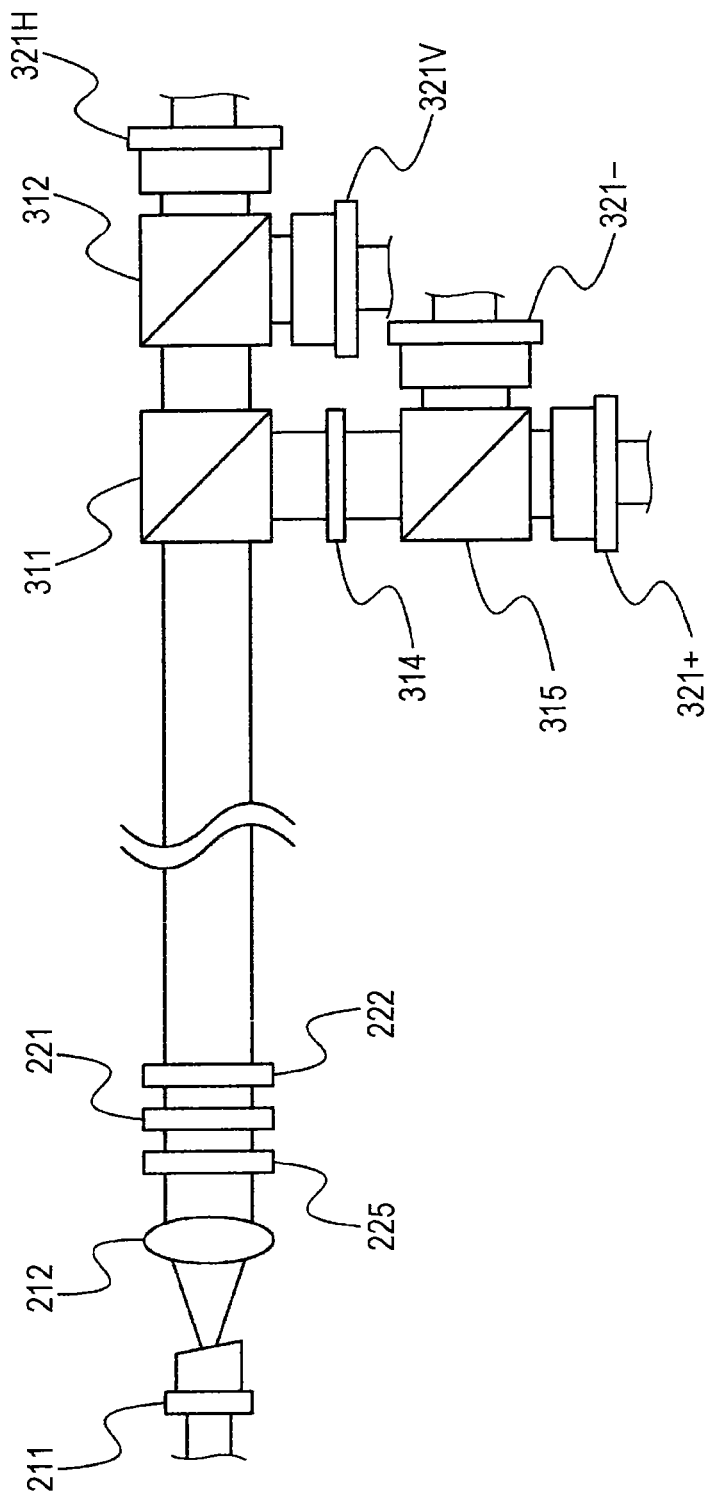
FIG. 5 is a diagram illustrating another configuration according to the second embodiment of the present disclosure.

In addition, as illustrated in FIG. 5, a ½ wavelength plate 314 is disposed between the non-polarization beam splitter 311 and the polarization beam splitter 315, so that the direction of the linear polarization is rotated by 45 degrees. By doing so, it is not necessary that the polarization beam splitter 315 is rotated by 45 degrees with respect to the surface where the polarization beam splitter 312 is installed.

The light-receiving unit 32 includes light-receiving device 321H, 321V, 321+, and 321−. The light-receiving device 321H detects the one light pulse which is polarization-split by the polarization beam splitter 312, and the light-receiving device 321V detects the other light pulse which is polarization-split by the polarization beam splitter 312. Similarly, the light-receiving device 321+ detects the one light pulse which is polarization-split by the polarization beam splitter 315, and the light-receiving device 321− detects the other light pulse which is polarization-split by the polarization beam splitter 315.

<3-2. Operations of Second Embodiment>

[Quantum Communication Operation]

With respect to the quantum communication of the BB84 protocol, the transmission side communication apparatus 20 performs the following operations.

The controller 26 drives the semiconductor light-emitting device 211 of the light source unit 21 by the pulse current to generate the light pulse. At this time, it is preferable that the number of photons per pulse be one or less (in the case where the intensity of the light pulse from the semiconductor light-emitting device 211 is strong, the number of photons per pulse may be set to be one or less by using a photo-sensing unit (not shown in this figure) such as an ND filter).

The light pulse generated by the light source unit 21 is incident on the liquid crystal retarder 221 of the polarization modulating unit 22. In addition, in the case where the polarizer 225 is installed, the light pulse is incident through the polarizer 225 on the liquid crystal retarder 221.

The liquid crystal retarder 221 is controlled by the controller 26 at random so that the phase difference occurring in the polarization components along the FAST axis and the SLOW axis is one of 0 degrees, 90 degrees, 180 degrees, and 270 degrees according to the arrival timing of the light pulse.

With respect to the polarization state of the light pulse passing through the liquid crystal retarder 221, in the case where the phase difference 0 is 0 degrees, the polarization state is the linear polarization of the incidence time without a change; in the case where the phase difference φ is 180 degrees, the polarization state is changed to the linear polarization perpendicular to the incident linear polarization; and in the case where the phase difference φ is 90 degrees or 270 degrees, the polarization states are changed to the circular polarizations which are different from each other in the direction. In addition, in the case where the phase difference φ is 90 degrees or 270 degrees, whether the polarization states are the left-handed circular polarization and the right-handed circular polarization or the right-handed circular polarization and the left-handed circular polarization is determined according to, the directions of the optical axes (the SLOW axis and the FAST axis) of the disposed liquid crystal retarder. The light pulse passing through the liquid crystal retarder 221 is incident on the ¼ wavelength plate 222.

The ¼ wavelength plate 222 is disposed so as to be tilted by 45 degrees with respect to the optical axis of the liquid crystal retarder 221. Therefore, in the case where the incident light pulse is a linear polarization, the linear polarization is used without a change; and in the case where the incident light pulse is a circular polarization, the light pulse is changed to a linear polarization which is tilted by 45 degrees with respect to the linear polarization.

Figure 6:
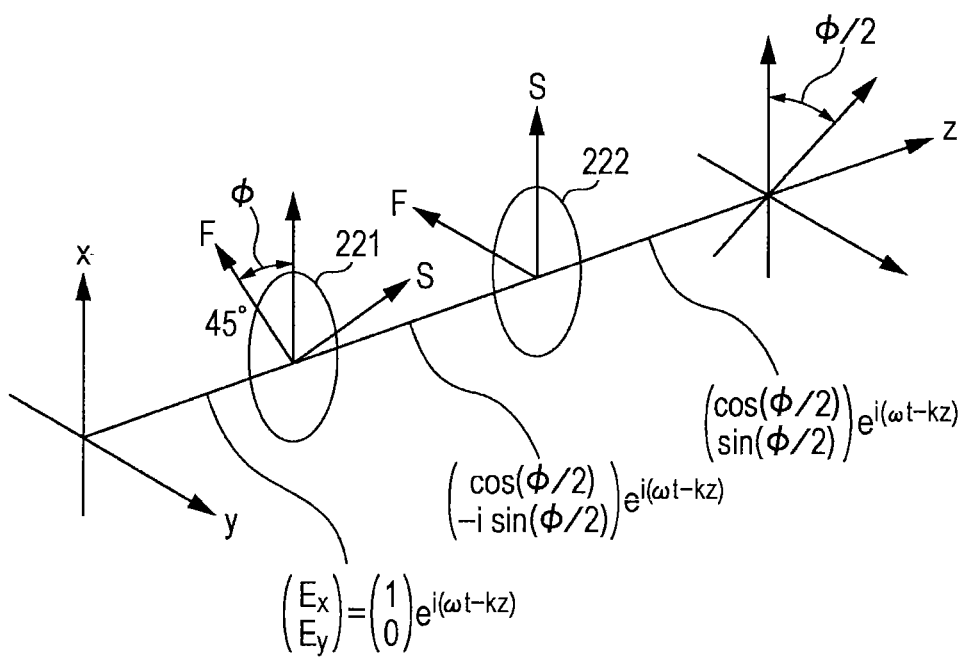
FIG. 6 is a diagram illustrating polarization modulation performed by a liquid crystal retarder and a ¼ wavelength plate.

FIG. 6 illustrates the polarization modulation performed by the liquid crystal retarder 221 and the ¼ wavelength plate 222. The linear polarization in the x direction illustrated in FIG. 6 is set to the vertical polarization. In addition, the FAST axis of the liquid crystal retarder 221 is set to the position tilted by 45 degrees with respect to the x-direction axis. In addition, the ¼ wavelength plate 222 is set to the position tilted by 45 degrees with respect to the optical axis of the liquid crystal retarder 221. In addition, the FAST axes of the liquid crystal retarder 221 and the ¼ wavelength plate 222 are indicated by "F", and the SLOW axes thereof are indicated by "S".

In this case, if the phase difference φ occurring in the polarization components along the FAST axis and the SLOW axis of the liquid crystal retarder 221 is set to 0 degrees, the light pulse passing through the liquid crystal retarder 221 becomes the vertical polarization. In addition, in the case where the phase difference φ is set to 90 degrees, the light pulse becomes the left-handed circular polarization; in the case where the phase difference φ is set to 180 degrees, the light pulse becomes the horizontal polarization; and in the case where the phase difference φ is set to 270 degrees, the light pulse becomes the right-handed circular polarization.

Herein, with respect to the angle indicating the polarization direction of the linear polarization, the perpendicular direction (x-axis direction) is set to 0 degrees, and the direction of rotation therefrom in the y-axis direction is set to be positive. Next, after the light pulse passes through the ¼ wavelength plate 222, in the case where the phase difference of the liquid crystal retarder 221 is 0 degrees, the light pulse becomes the vertical polarization V; in the case where the phase difference is 90 degrees, the light pulse becomes the +45-degree-tilted linear polarization +; in the case where the phase difference is 180 degrees, the light pulse becomes the horizontal polarization H; and in the case where the phase difference is 270 degrees, the light pulse becomes the −45-degree-tilted linear polarization −.

In this manner, the light pulse of which the polarization state is controlled to be one of the four polarization states at random by the controller 26 is output from the transmission side communication apparatus 20.

The reception side communication apparatus 30 allows the non-polarization beam splitter 311 of the optical unit 31 to divide the light pulse emitted from the transmission side communication apparatus 20. The one of the light pulses split by the non-polarization beam splitter 311 is incident on the polarization beam splitter 312, divided into the polarization components, and incident on the light-receiving device 321H or the light-receiving device 321V.

The other of the light pulses split by the non-polarization beam splitter 311 is incident on the polarization beam splitter 315, divided into the polarization components, and incident on the light-receiving device 321+ or the light-receiving device 321−.

The light pulse detection probability of the light-receiving device of each polarization state is listed in Table 2 by replacing and reading the left-handed circular polarization L, the right-handed circular polarization R, the light-receiving device 321L, and the light-receiving device 321R of Table 1 with the linear polarization+, the linear polarization-, the light-receiving device 321+, and the light-receiving device 321−, respectively. In addition, Table 2 also lists the values of an ideal case where the number of photons per pulse is "1", the splitting ratio of the non-polarization beam splitter 311 is p:(1-p) (herein, 0<p<1), and there is neither optical loss nor eavesdropping.

TABLE 2

|  |  | Light-Receiving Device 321 | | | |
| --- | --- | --- | --- | --- | --- |
|  |  | V | H | + | − |
| Polarization | V | p | 0 | 0.5 (1 − p) | 0.5 (1 − p) |
| State of | H | 0 | p | 0.5 (1 − p) | 0.5 (1 − p) |
| Transmitted | + | 0.5 p | 0.5 p | (1 − p) | 0 |
| Light Pulse | − | 0.5 p | 0.5 p | 0 | (1 − p) |

In the case where the light pulse which is the vertical polarization V or the horizontal polarization H is turned toward the light-receiving device 321H or the light-receiving device 321V by the non-polarization beam splitter 311, the probability thereof is "p", and the light pulses are detected by the corresponding light-receiving devices. In other words, in the case where the light pulse is the vertical polarization V, the probability that the light pulse is detected by the light-receiving device 321V becomes "p", and the probability that the light pulse is detected by the light-receiving device 321H becomes "0". In addition, in the case where the light pulse is the horizontal polarization H, the probability that the light pulse is detected by the light-receiving device 321V becomes "0", and the probability that the light pulse is detected by the light-receiving device 321H becomes "p".

In addition, in the case where the light pulse which is the vertical polarization V or the horizontal polarization H is turned toward the light-receiving device 321+ or the light-receiving device 321− by the non-polarization beam splitter 311, the probability thereof is "1-p". In addition, since all the light pulses are detected with the equal probability of "0.5" by the light-receiving devices, the probability that the light pulse is detected by the light-receiving devices 321+ and 321− becomes the probability of "0.5(1-p)" in the case where the light pulse is any one of the vertical polarization V and the horizontal polarization H.

Similarly, in the case where the light pulse is the +45-degree linear polarization +, the probability that the light pulse is detected by the light-receiving device 321+ becomes "1-p", and the probability that the light pulse is detected by the light-receiving device 321− becomes "0". In addition, in the case where the light pulse is the −45-degree linear polarization −, the probability that the light pulse is detected by the light-receiving device 321+ becomes "0", and the probability that the light pulse is detected by the light-receiving device 321− becomes "1-p". In addition, the probability that the light pulse is detected by the light-receiving devices 321V and 321H becomes the probability of "0.5p" in the case where the light pulse is any one of the +45-degree linear polarization + or the −45-degree linear polarization −. In the BB84 protocol, the portion which performs the quantum communication repetitively performs the operations described hereinbefore.

[Classical Communication Operation]

Next, after the quantum communication of the BB84 protocol, the classical communication is performed. The transmission side communication apparatus 20 and the reception side communication apparatus 30 perform the protocol described hereinafter by using the public communication line (that is, the communication details are not encrypted but all the communication details may be recognized by an eavesdropper).

(1) Basis Exchange

The reception side communication apparatus 30 communicates with the transmission side communication apparatus 20 through the public communication line, for example, the classical communication line 55 to transmit only the information indicating whether the linear polarization (the vertical polarization V or the horizontal polarization H) is detected or the 45-degree-tilted linear polarization (the +45-degree linear polarization + or the −45-degree linear polarization −) is detected among the reception results of the quantum communication from the controller 36 through the communication unit 35 and the communication unit 25 of the transmission side communication apparatus 20 to the controller 26. For example, in the case where the vertical polarization V is detected, the information indicating "the vertical polarization V is detected" is not transmitted, but only the information indicating "the linear polarization is detected" is transmitted. The controller 26 of the transmission side communication apparatus 20 detects which reception result of which time point is correct among the reception results and notifies the detection result to the controller 36 of the reception side communication apparatus 30. The controller 36 of the reception side communication apparatus 30 selects only the correct data based on the notified detection result. In other words, in the case where the transmission side communication apparatus 20 transmits the light pulse which is the linear polarization (V or H) and the reception side communication apparatus 30 detects the 45-degree-tilted linear polarization (+ or −), the shared secret information may not be generated. In addition, in the case where the transmission side communication apparatus 20 transmits the light pulse which is the 45-degree-tilted linear polarization (+ or −) and the reception side communication apparatus 30 detects the linear polarization (V or H), the shared secret information may not be generated. Therefore, the data at this time are discarded. In addition, from the remaining data, for example, in the case of the linear polarization, if the vertical polarization V is set to "0" and the horizontal polarization H is set to "1" and if the linear polarization + is set to "0" and the linear polarization − is set to "1", the correlated random bit sequence may be shared by the transmitting apparatus and the receiving apparatus. The common key is generated based on the random bit sequence by the transmission side communication apparatus 20 and the reception side communication apparatus 30.

In addition, on the contrary, the transmission side communication apparatus 20 may transmit only the information indicating "whether the linear polarization is transmitted or the 45-degree-tilted linear polarization is transmitted" from the controller 26 through the communication unit 25 and the communication unit 35 of the transmission side communication apparatus 30 to the controller 36, and the controller 36 of the reception side communication apparatus 30 may select only the correct data based on the notified basis.

In addition, in some cases, the bit sequence shared by the transmission side communication apparatus and the reception side communication apparatus may include an error caused by the quantum communication line 51 or an error occurring during the transmission and the reception. Therefore, similarly to the first embodiment, the error correction which corrects errors, the estimation of the error rate, and the privacy amplification which reduces an amount of the information which is considered to be subject to eavesdropping based on the estimated error rate are performed.

The common key stored in the transmission side communication apparatus 20 and the reception side communication apparatus 30 is used at any time when encryption of communication is necessary. For example, when the encryption communication is performed by using the common key encryption system, the amount of plaintext which is encrypted by using one common key is determined in advance. Herein, if the communication amount exceeds the determined communication amount, the transmission side communication apparatus and the reception side communication apparatus simultaneously extract the common key from the key memories and update the key used for the common key encryption system. In addition, if the communication amount is almost constant but it not greatly changed, the transmission side communication apparatus 20 and the reception side communication apparatus 30 simultaneously extract the common key from the key memories at every predetermined time interval and update the key used for the common key encryption system.

In this manner, in the second embodiment, since the ¼ wavelength plate is combined with the liquid crystal retarder, the polarization modulation which converts the polarization state of the collimated light pulse to one of the four types of linear polarization states is performed. In the second embodiment, it is possible to easily miniaturize the communication apparatus and to mount it on a portable electronic apparatus or the like in comparison with a communication apparatus using a phase modulator or the like in the related art.

<4. Third Embodiment>

In the quantum encryption communication, for example, as disclosed in "Secret key can be obtained from both compatible and incompatible measurements in the six-state QKD protocol" (Matsumoto Ryutaro, IEICE Technical Report IT2007-43, ISEC20070140, WBS2007-74 (2008-02)) or the like, the 6-state type of protocol (hereinafter, referred to as a 6-state protocol) as an extension of the B84 protocol may be used. Therefore, in the third embodiment, the case of performing the quantum key distribution by using the six types of polarization states including the four types of linear polarizations and the two types of circular polarizations is described.

<4-1. Configuration of Third Embodiment>

Figure 7:
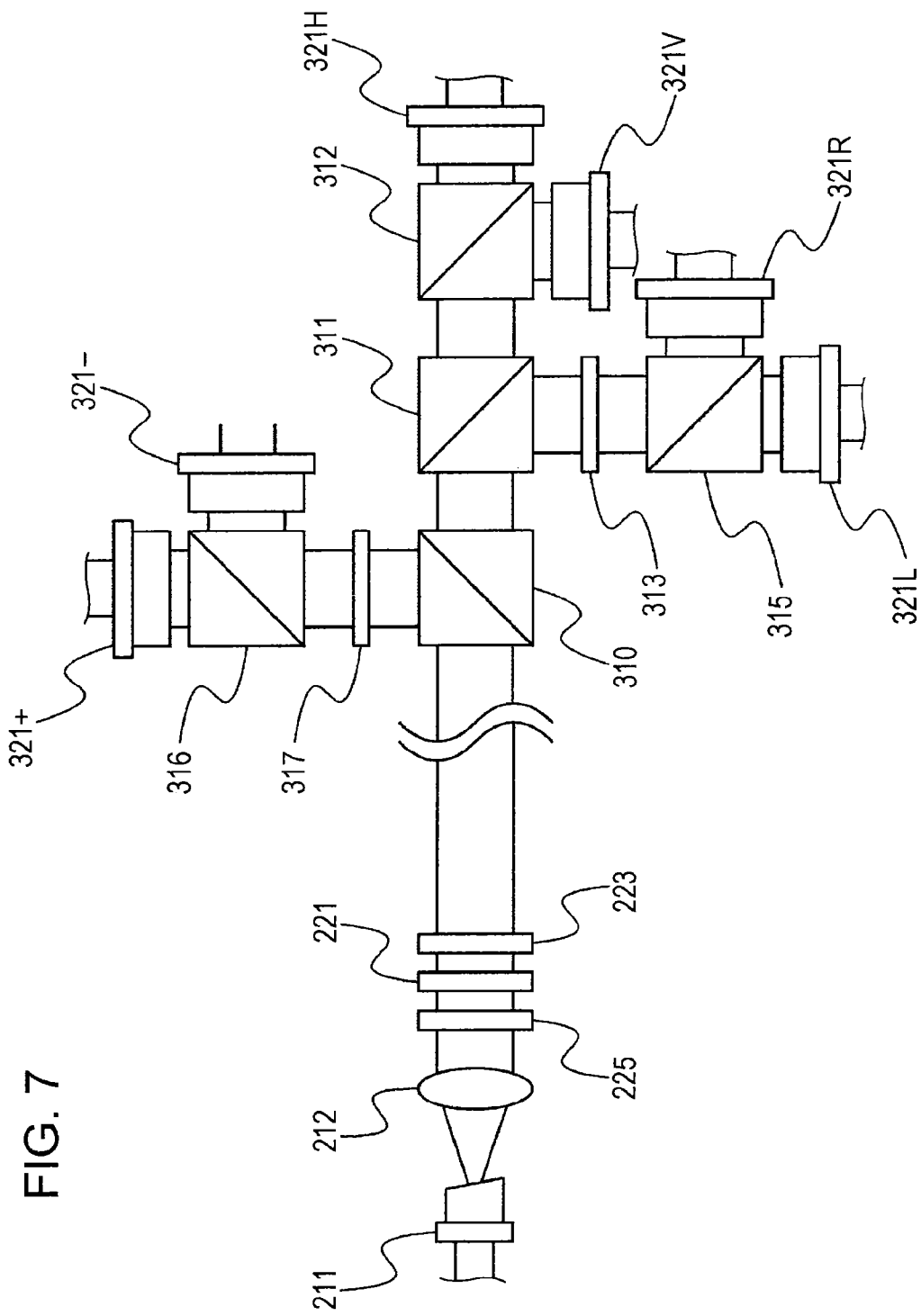
FIG. 7 is a diagram illustrating a configuration according to a third embodiment of the present disclosure.

FIG. 7 illustrates a configuration of a third embodiment. In addition, FIG. 7 illustrates the configuration of the light source unit 21, the polarization modulating unit 22, the optical unit 31, and the light-receiving unit 32 illustrated in FIG. 1.

The light source unit 21 of the transmission side communication apparatus 20 is configured by using a semiconductor light-emitting device 211 such as a laser diode or an LED and a lens 212 which collimates a light pulse emitted from the semiconductor light-emitting device 211.

The polarization modulating unit 22 includes liquid crystal retarders 221 and 223 which convert the polarization state of the collimated light pulse to one of the four types of linear polarization states and the two types of circular polarization states. The liquid crystal retarder 221 is disposed so that the optical axis is tilted by 45 degrees with respect to the direction of the linear polarization of the light pulse emitted from the light source unit 21. In addition, the liquid crystal retarder 223 is disposed so as to be tilted by 45 degrees with respect to the liquid crystal retarder 223.

The liquid crystal retarders 221 and 223 change the phase difference occurring in the polarization components along the FAST axis and the SLOW axis according to the control signal of the controller 26.

In addition, in the polarization modulating unit 22, in the case where the light emitted from the light source unit 21 is not a linear polarization, or the case where it is difficult to accurately control the polarization direction with respect to the optical axis of the liquid crystal retarder 221 although the light is the linear polarization, a polarizer 225 is disposed in the light pulse incidence surface side of the liquid crystal retarder 221. For example, the polarizer 225 is integrated with the liquid crystal retarder 221 in the light pulse incidence surface side of the liquid crystal retarder 221 so that the optical axis of the liquid crystal retarder 221 is set to be tilted by 45 degrees with respect to the linear polarization emitted from the polarizer 225. According to this configuration of the polarization modulating unit 22, although the position of the polarization modulating unit 22 is not accurately controlled with respect to the light source unit 21, it is possible to set the polarization direction and the optical axis of the liquid crystal retarder 221 at a desired angle.

The optical unit 31 of the reception side communication apparatus 30 includes non-polarization beam splitters 310 and 311, polarization beam splitters 312, 315, and 316, and ¼ wavelength plate 313. The non-polarization beam splitter 310 performs division without a change in the polarization state of the light pulse emitted from the transmission side communication apparatus 20. The non-polarization beam splitter 311 divides the one of the light pulses split by the non-polarization beam splitter 310 without a change in the polarization state. The polarization beam splitter 312 performs polarization separation on the one of the light pulses split by the non-polarization beam splitter 311 into polarizations. With respect to the polarization state of the other light pulse spilt by the non-polarization beam splitter 311, the ¼ wavelength plate 313 converts the linear polarization to the circular polarization and converts the circular polarization to the linear polarization. The polarization beam splitter 315 performs the polarization separation on the light pulse of which the polarization state is changed by the ¼ wavelength plate 313.

The polarization beam splitter 316 is installed, for example, so as to be rotated around the incident light as an axis to be tilted by 45 degrees with respect to the surface where the polarization beam splitter 312 is installed, so that the light pulse is split into two linear polarizations in the directions which are tilted by 45 degrees with respect to the polarization beam splitter 312. In addition, a ½ wavelength plate 317 is disposed between the non-polarization beam splitter 310 and the polarization beam splitter 316, so that the direction of the linear polarization is rotated by 45 degrees. Therefore, it is not necessary that the polarization beam splitter 316 is installed to be tilted by 45 degrees. In addition, which one of the three light pulses split by the non-polarization beam splitters 310 and 311 is polarization-separated by which one of the polarization beam splitters may not be the same as that illustrated.

The light-receiving unit 32 includes light-receiving devices 321H, 321V, 321L, 321R, 321+, and 321−. The light-receiving device 321H detects the one light pulse which is polarization-split by the polarization beam splitter 312, and the light-receiving device 321V detects the other light pulse which is polarization-split by the polarization beam splitter 312. Similarly, the light-receiving device 321L detects the one light pulse which is polarization-split by the polarization beam splitter 315, and the light-receiving device 321R detects the other light pulse which is polarization-split by the polarization beam splitter 315. In addition, the light-receiving device 321+ detects the one light pulse which is polarization-split by the polarization beam splitter 316, and the light-receiving device 321− detects the other light pulse which is polarization-split by the polarization beam splitter 316.

<4-2. Operations of Third Embodiment>

[Quantum Communication Operation]

With respect to the quantum communication of the E-state protocol, the transmission side communication apparatus 20 performs the following operations.

The controller 26 drives the semiconductor light-emitting device 211 of the light source unit 21 by the pulse current to generate the light pulse. At this time, it is preferable that the number of photons per pulse be one or less (in the case where the intensity of the light pulse from the semiconductor light-emitting device 211 is strong, the number of photons per pulse may be set to be one or less by using a photo-sensing unit (not shown in this figure) such as an ND filter).

The light pulse generated by the light source unit 21 is incident on the liquid crystal retarder 221 of the polarization modulating unit 22. In addition, in the case where the polarizer 225 is installed, the light pulse is incident through the polarizer 225 on the liquid crystal retarder 221.

The liquid crystal retarder 221 is controlled by the controller 26 at random so that the phase difference occurring in the polarization components along the FAST axis and the SLOW axis is one of 0 degrees, 90 degrees, 180 degrees, and 270 degrees according to the arrival timing of the light pulse.

With respect to the polarization state of the light pulse passing through the liquid crystal retarder 221, in the case where the phase difference φ is 0 degrees, the polarization state is the linear polarization of the incidence time without a change; in the case where the phase difference φ is 180 degrees, the polarization state is changed to the linear polarization perpendicular to the incident linear polarization; and in the case where the phase difference φ is 90 degrees or 270 degrees, the polarization states are changed to the circular polarizations which are different from each other in the direction. In addition, in the case where the phase difference φ is 90 degrees or 270 degrees, whether the polarization states are the left-handed circular polarization and the right-handed circular polarization or the right-handed circular polarization and the left-handed circular polarization is determined according to, the directions of the optical axes (the SLOW axis and the FAST axis) of the disposed liquid crystal retarder. The light pulse passing through the liquid crystal retarder 221 is incident on the liquid crystal retarder 223.

The liquid crystal retarder 223 is disposed so as to be tilted by 45 degrees with respect to the optical axis of the liquid crystal retarder 221, and the liquid crystal retarder 223 is controlled by the controller 26 at random so that the phase difference θ occurring in the polarization components along the FAST axis and the SLOW axis of the liquid crystal retarder 223 is one of 0 degrees and 90 degrees.

In the case where the phase difference 0 of the liquid crystal retarder 223 is 0 degrees, the polarization state of the light pulse passing through the liquid crystal retarder 223 is not changed. In addition, in the case where the phase difference θ of the liquid crystal retarder 223 is 90 degrees, the incident light pulse which is a linear polarization is the linear polarization without a change, and the incident light pulse which is a circular polarization is changed to a linear polarization which is tilted by 45 degrees with respect to the linear polarization.

Figure 8:
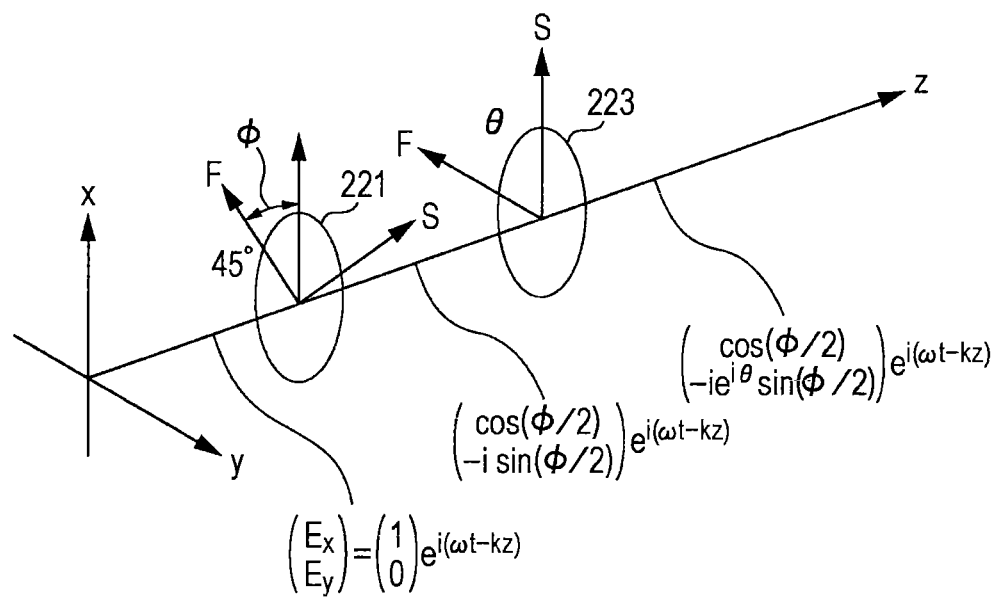
FIG. 8 is a diagram illustrating polarization modulation performed by liquid crystal retarders.

FIG. 8 illustrates the polarization modulation performed by the liquid crystal retarders 221 and 223. The linear polarization in the x direction illustrated in FIG. 8 is set to the vertical polarization. In addition, the FAST axis of the liquid crystal retarder 221 is set to the position tilted by 45 degrees with respect to the x-direction axis. In addition, the liquid crystal retarder 223 is set to the position tilted by 45 degrees with respect to the optical axis of the liquid crystal retarder 221. In addition, the FAST axes of he liquid crystal retarders 221 and 223 are indicated by "F", and the SLOW axes thereof are indicated by "S".

In this case, if the phase difference φ occurring in the polarization components along the FAST axis and the SLOW axis of the liquid crystal retarder 221 is set to 0 degrees, the light pulse passing through the liquid crystal retarder 221 becomes the vertical polarization. In addition, in the case where the phase difference φ is set to 90 degrees, the light pulse becomes the left-handed circular polarization; in the case where the phase difference φ is set to 180 degrees, the light pulse becomes the horizontal polarization; and in the case where the phase difference φ is set to 270 degrees, the light pulse becomes the right-handed circular polarization.

Herein, with respect to the angle indicating the polarization direction of the linear polarization, the perpendicular direction (x-axis direction) is set to 0 degrees, and the direction of rotation therefrom in the y-axis direction is set to be positive. After the light pulse passes through the liquid crystal retarder 223, in the case where the phase difference θ of the liquid crystal retarder 2 is 0 degrees, the polarization state is not changed. Therefore, in the case where the phase difference of the liquid crystal retarder 221 is 0 degrees, the light pulse becomes the vertical polarization; in the case where the phase difference φ is 90 degrees, the light pulse becomes the left-handed circular polarization; in the case where the phase difference φ is 180 degrees, the light pulse becomes the horizontal polarization, in the case where the phase difference φ is 270 degrees, the light pulse becomes the right-handed circular polarization.

In addition, when the phase difference θ of the liquid crystal retarder 223 is 90 degrees, in the case where the phase difference φ of the liquid crystal retarder 221 is 0 degrees, the light pulse becomes the vertical polarization; in the case where the phase difference φ is 90 degrees, the light pulse becomes the +45-degree-tilted linear polarization; in the case where the phase difference φ is 180 degrees, the light pulse becomes the horizontal polarization; and in the case where the phase difference φ is 270 degrees, the light pulse becomes the −45-degree-tilted linear polarization. In addition, Table 3 illustrates a relationship among the phase difference φ of the liquid crystal retarder 221, the phase difference 8 of the liquid crystal retarder 223, and the polarization-modulated polarization state.

TABLE 3

|  | θ = 0 degrees | θ = 90 degrees |
|---|---|---|
| φ = 0 degrees | V (Vertical Polarization) | V (Vertical Polarization) |
| φ = 90 degrees | L (Left-Handed Circular Polarization | + (+45-degree Linear Polarization R |
| φ = 180 degrees | H (Horizontal Polarization) | H (Horizontal Polarization) |
| φ = 2700 degrees | R (Right-Handed Circular Polarization) | − (−45-degree Linear Polarization R |

In this manner, the light pulse of which the polarization state is controlled to be one of the six polarization states at random by the controller 26 is output from the transmission side communication apparatus 20.

The reception side communication apparatus 30 allows the non-polarization beam splitter 310 of the optical unit 31 to divide the light pulse emitted from the transmission side communication apparatus 20. The one of the light pulses split by the non-polarization beam splitter 310 is incident on the non-polarization beam splitter 311 to be further divided. The one of the light pulses split by the non-polarization beam splitter 311 is incident on the polarization beam splitter 312, divided into the polarization components, and incident on the light-receiving device 321H or the light-receiving device 321V.

The other of the light pulses split by the non-polarization beam splitter 311 passes through the ¼ wavelength plate 313 to allow the polarization state to be changed, and after that, divided by the polarization beam splitter 315. The split light pulse is incident on the polarization beam splitter 315, divided into the polarization components, and incident on the light-receiving device 321L or the light-receiving device 321R.

The other of the light pulses split by the non-polarization beam splitter 310 is incident on the polarization beam splitter 316 which divides the light pulse into the two linear polarizations in the 45-degree-tilted directions, divided into the polarization components, and incident on the light-receiving device 321+ or the light-receiving device 321−.

For the convenience of the description, in the above disclosure, although it is described that "the light pulse is split", in an actual case, it is not necessary that one light pulse is detected by all the light-receiving devices. This is because the intensity of the light pulse is set so that the number of photons per pulse is one or less, and thus, the photons are detected by one of the six light-receiving devices to be converted to an electrical signal.

Similarly to the first and second embodiments, the light pulse detection probability of the light-receiving device of each polarization state is listed in Table. In addition, in Table 4, the number of photons per pulse is "1"; the splitting ratio of the non-polarization beam splitter 310 is p:(1-p) (herein, 0<p<1); and the splitting ratio of the non-polarization beam splitter 311 is q:(1-q) (herein, 0<q<1). In addition, Table 4 lists the values of an ideal case where there is neither optical loss nor eavesdropping.

321R becomes the probability of "0.5p(1-q)" in the case where the light pulse is any one of the vertical polarization V and the horizontal polarization H.

In addition, in the case where the light pulse which is the vertical polarization V or the horizontal polarization H is turned toward the light-receiving device 321+ or the light-receiving device 321− by the non-polarization beam splitter 310, the probability thereof is "1-p". In addition, since all the light pulses are detected with the equal probability of "0.5" by the light-receiving devices, the probability that the light pulse is detected by the light-receiving devices 321+ and 321− becomes the probability of "0.5(1-p)" in the case where the light pulse is any one of the vertical polarization V and the horizontal polarization H.

Similarly, in the case where the light pulse is the left-handed circular polarization L, the probability that the light pulse is detected by the light-receiving device 321L becomes "p(1-q)", and the probability that the light pulse is detected by the light-receiving device 321R becomes "0". In addition, in the case where the light pulse is the right-handed circular polarization R, the probability that the light pulse is detected by the light-receiving device 321L becomes "0", and the probability that the light pulse is detected by the light-receiving device 321R becomes "p(1-q)". In addition, the probability that the light pulse is detected by the light-receiving devices 321V and 321H becomes the probability of "0.5pq" in the case where the light pulse is any one of the left-handed circular polarization L and the right-handed circular polarization R. Therefore, the probability that the light pulse is detected by the light-receiving devices 321+ and 321− becomes the probability of "0.5(1-p)" in the case where the

TABLE 4

| | | Light-Receiving Device 321 | | | | | |
|---|---|---|---|---|---|---|---|
| | | V | H | L | R | + | − |
| Polarization State of Transmitted Light Pulse | V | pq | 0 | 0.5 p(1 − q) | 0.5 p(1 − q) | 0.5(1 − p) | 0.5(1 − p) |
| | H | 0 | pq | 0.5 p(1 − q) | 0.5 p(1 − q) | 0.5(1 − p) | 0.5(1 − p) |
| | L | 0.5 pq | 0.5 pq | p(1 − q) | 0 | 0.5(1 − p) | 0.5(1 − p) |
| | R | 0.5 pq | 0.5 pq | 0 | p(1 − q) | 0.5(1 − p) | 0.5(1 − p) |
| | + | 0.5 pq | 0.5 pq | 0.5 p(1 − q) | 0.5 p(1 − q) | (1 − p) | 0 |
| | − | 0.5 pq | 0.5 pq | 0.5 p(1 − q) | 0.5 p(1 − q) | 0 | (1 − p) |

In the case where the light pulse which is the vertical polarization V or the horizontal polarization H is turned toward the light-receiving device 321H or the light-receiving device 321V by the non-polarization beam splitter 311, the probability thereof is "pq", and the light pulses are detected by the corresponding light-receiving devices. In other words, in the case where the light pulse is the vertical polarization V, the probability that the light pulse is detected by the light-receiving device 321V becomes. "pq", and the probability that the light pulse is detected by the light-receiving device 321H becomes "0". In addition, in the case where the light pulse is the horizontal polarization H, the probability that the light pulse is detected by the light-receiving device 321V becomes "0", and the probability that the light pulse is detected by the light-receiving device 321H becomes "pq".

In addition, in the case where the light pulse which is the vertical polarization V or the horizontal polarization H is turned toward the light-receiving device 321L or the light-receiving device 321R by the non-polarization beam splitter 311, the probability thereof is "p(1-q)". In addition, since all the light pulses are detected with the equal probability of "0.5" by the light-receiving devices, the probability that the light pulse is detected by the light-receiving devices 321L and light pulse is any one of the left-handed circular polarization L and the right-handed circular polarization R.

In addition, in the case where the light pulse is the linear polarization +, the probability that the light pulse is detected by the light-receiving device 321+ becomes "1-p", and the probability that the light pulse is detected by the light-receiving device 321− becomes "0". In addition, in the case where the light pulse is the linear polarization − the probability that the light pulse is detected by the light-receiving device 321+ becomes "0", and the probability that the light pulse is detected by the light-receiving device 321− becomes "1-p". In addition, the probability that the light pulse is detected by the light-receiving devices 321V and 321H becomes the probability of "0.5pq" in the case where the light pulse is any one of the linear polarization + and the linear polarization −. Therefore, the probability that the light pulse is detected by the light-receiving devices 321L and 321R becomes the probability of "0.5p(1-q)" in the case where the light pulse is any one of the linear polarization + and the linear polarization −. In the 6-state protocol, the portion which performs the quantum communication repetitively performs the operations described hereinbefore.

[Classical Communication Operation]

Next, after the quantum communication of the 6-state protocol, the classical communication is performed. The transmission side communication apparatus 20 and the reception side communication apparatus 30 perform the protocol described hereinafter by using the public communication line (that is, the communication details are not encrypted but all the communication details may be recognized by an eavesdropper).

(1) Basis Exchange

The reception side communication apparatus 30 communicates with the transmission side communication apparatus 20 through the public communication line, for example, the classical communication line 55 to transmit only the information indicating whether any one of the linear polarization (the vertical polarization V or the horizontal polarization H), the 45-degree-tilted linear polarization (the +45-degree linear polarization+ or the −45-degree linear polarization−), and the circular polarization (the left-handed circular polarization L or the right-handed circular polarization R) is detected among the reception results of the quantum communication from the controller 36 through the communication unit 35 and the communication unit 25 of the transmission side communication apparatus 20 to the controller 26. For example, in the case where the vertical polarization V is detected, the information indicating "the vertical polarization V is detected" is not transmitted, but only the information indicating "the linear polarization is detected" is transmitted. The controller 26 of the transmission side communication apparatus 20 detects which reception result of which time point is correct among the reception results and notifies the detection result to the controller 36 of the reception side communication apparatus 30. The controller 36 of the reception side communication apparatus 30 selects only the correct data based on the notified detection result. In other words, in the case where the transmission side communication apparatus 20 transmits the light pulse which is the linear polarization (V or H) and the reception side communication apparatus 30 detects the circular polarization (L or R) or the 45-degree-tilted linear polarization (+ or −), since the shared secret information may not be generated, the data are discarded. In addition, in the case where the transmission side communication apparatus 20 transmits the light pulse which is the circular polarization (L or R) and the reception side communication apparatus 30 detects the linear polarization (V or H) or the 45-degree-tilted linear polarization (+ or −), since the shared secret information may not generated, the data are discarded. In addition, in the case where the transmission side communication apparatus 20 transmits the light pulse which is the 45-degree-tilted linear polarization (+ or −) and the reception side communication apparatus 30 detects the linear polarization (V or H) or the circular polarization (L or R), since the shared secret information may not be generated, the data are discarded.

In addition, from the remaining data, for example, in the case of the linear polarization, if the vertical polarization V is set to "0" and the horizontal polarization H is set to "1"; in the case of the circular polarization, if the left-handed circular polarization L is set to "0" and the right-handed circular polarization R is set to "1"; and in the case of the 45-degree-tilted linear polarization, if the +45-degree linear polarization + is set to "0" and the −45-degree linear polarization − is set to "1". By doing so, the correlated random bit sequence may be shared by the transmission side communication apparatus and the reception side communication apparatus. The common key is generated based on the random bit sequence by the transmission side communication apparatus 20 and the reception side communication apparatus 30.

In addition, on the contrary, the transmission side communication apparatus 20 may transmit only the information indicating "which one of the linear polarization, the 45-degree-tilted linear polarization, and the circular polarization is transmitted from the controller 26 through the communication unit 25 and the communication unit 35 of the transmission side communication apparatus 30 to the controller 36, and the controller 36 of the reception side communication apparatus 30 may select only the correct data based on the notified basis.

(2) Estimation of Error Rate

In the case where the transmission side communication apparatus 20 transmits the light pulse which is the linear polarization (V or H) and the reception side communication apparatus 30 detects the linear polarization (V or H), the case where the transmission side communication apparatus 20 transmits the light pulse which is the circular polarization (L or R) and the reception side communication apparatus 30 detects the circular polarization (L or R), and the case where the transmission side communication apparatus 20 transmits the light pulse which is the 45-degree-tilted linear polarization (+ or −) and the reception side communication apparatus 30 detects the 45-degree-tilted linear polarization (+ or −), about a half of the data are selected at random among the bit sequence obtained through the basis exchange, and the error rate is estimated by combining the values there by the transmission side communication apparatus 20 and the reception side communication apparatus 30. The data used at this time are removed.

(3) Error Correction

In the error correction, similarly to the first embodiment or the like, the error correction is performed on the bit sequence where the data used for the estimation of the error rate are removed.

(4) Privacy Amplification

In the privacy amplification, similarly to the first embodiment or the like, the privacy amplification is performed on the error-corrected bit sequence according to the estimated error rate. Herein, in the case where the error rate is large and the length of the bit sequence becomes zero, the key distribution fails. In addition, if the error rate is small (for example, equal to or smaller than about 12.6% in the case of the 6-state protocol), it is possible to obtain the bit sequence of which the length is longer than 1. The obtained bit sequence is stored as the common key in the key memory 23 of the transmission side communication apparatus 20 and the key memory 33 of the reception side communication apparatus 30.

In this manner, in the third embodiment, the liquid crystal retarder 223 of which the optical axis is tilted by 45 degrees with respect to the optical axis of the liquid crystal retarder 221 is disposed in the emitting surface side of the liquid crystal retarder 221. Therefore, the phase difference is changed by the liquid crystal retarders 221 and 223, so that the polarization state of the collimated light pulse may be converted to one of the six types of polarization states. Therefore, even in the case where the 6-state type protocol is used, it is possible to easily miniaturize the communication apparatus and to mount it on a portable electronic apparatus or the like.

<5. Fourth Embodiment>

In the quantum encryption communication, for example, as disclosed in Japanese Unexamined Patent Application Publication No. 2007-286551, the decoy method capable of further increasing the encrypted intensity of the quantum key distribution by transmitting the light pulse which the intensity modulation is performed on is used. Therefore, in a fourth embodiment, a case of performing the quantum key distribution by using the decoy method in the BB84 protocol using the four types of polarization states including the two types of linear polarizations and the two types of circular polarizations is described.

<5-1. Configuration of Fourth Embodiment>

Figure 9:
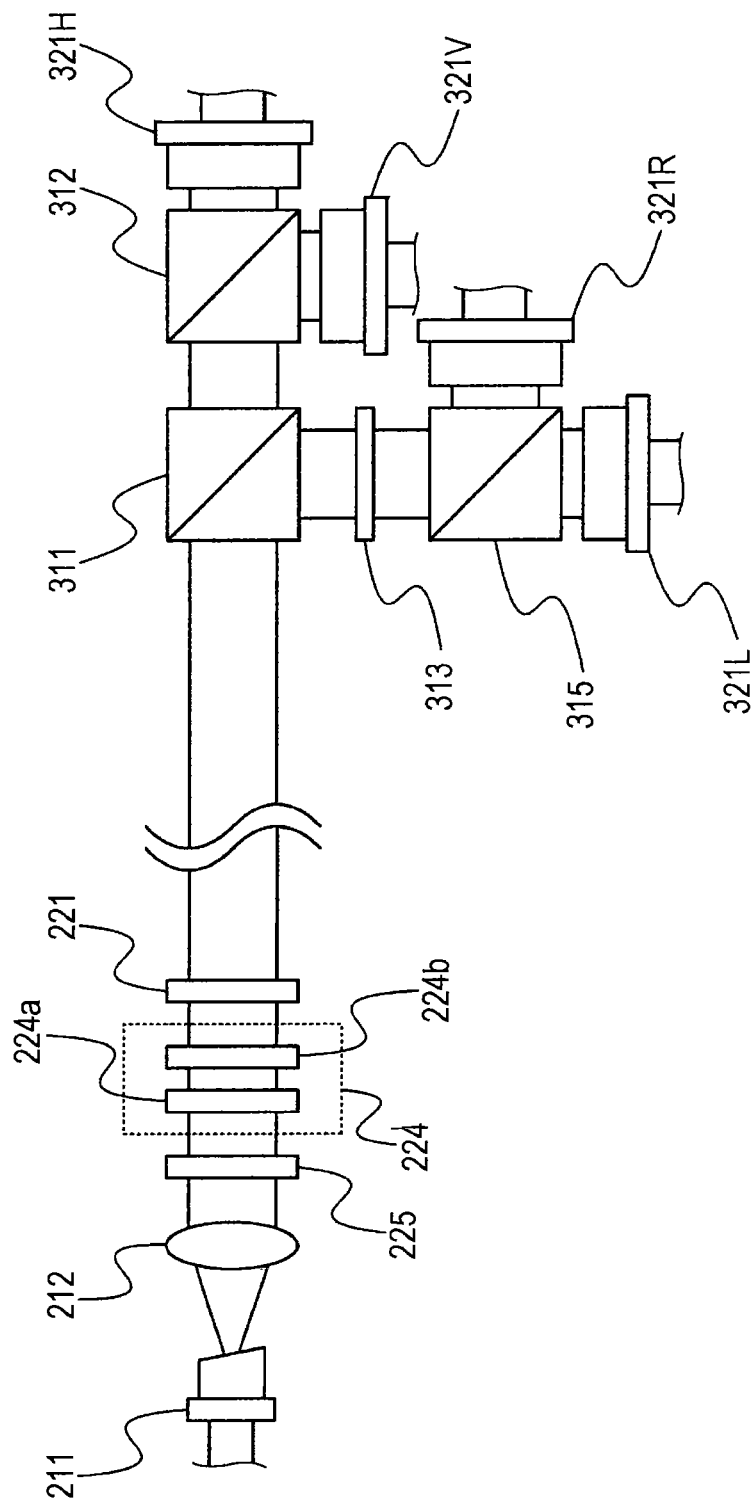
FIG. 9 is a diagram illustrating a configuration according to a fourth embodiment of the present disclosure.

FIG. 9 illustrates a configuration of the fourth embodiment. In addition, FIG. 9 illustrates the configuration of the light source unit 21, the polarization modulating unit 22, the optical unit 31, and the light-receiving unit 32 illustrated in FIG. 1.

The light source unit 21 of the transmission side communication apparatus 20 is configured by using a semiconductor light-emitting device 211 such as a laser diode or an LED and a lens 212 which collimates a light pulse emitted from the semiconductor light-emitting device 211.

The polarization modulating unit 22 includes a liquid crystal retarder 221 which converts the polarization state of the collimated light pulse to one of the four types of polarization states. The liquid crystal retarder 221 is disposed so that the optical axis is tilted by 45 degrees with respect to the polarization axis of the polarizer 224b of the later-described intensity modulator 224. The liquid crystal retarder 221 changes the phase difference occurring in the polarization components along the FAST axis and the SLOW axis according to the control signal of the controller 26.

An intensity modulator 224 which performs the intensity modulation of the light pulse is disposed in the incidence surface side of the liquid crystal retarder 221. The intensity modulator 224 is configured by using a liquid crystal retarder 224a and a polarizer 224b. The liquid crystal retarder 224a is disposed so that the optical axis of the liquid crystal retarder 224a is tilted by 45 degrees with respect to the direction of the linear polarization of the incident light pulse. In the case where the light emitted from the light source unit 21 is the linear polarization, the polarization axis of the polarizer 224b is set to the direction perpendicular to the polarization direction.

The liquid crystal retarder 224a changes the phase difference occurring in the polarization components along the FAST axis and the SLOW axis according to the control signal of the controller 26. In this manner, the phase difference is changed, so-that the intensity of the light pulse output through the polarizer 224b is adjusted.

In addition, in the fourth embodiment, although the intensity modulator 224 is implemented with an optical system including the liquid crystal retarder 224a and the polarizer 224b, the intensity modulation may be performed by modulating a current value for driving the semiconductor light-emitting device 211. In addition, an optical intensity modulator using a non-linear optical crystal or the like may also be used.

In addition, in the polarization modulating unit 22, in the case where the light emitted from the light source unit 21 is not the linear polarization or the case where it is difficult to accurately control the polarization direction with respect to the optical axis of the liquid crystal retarder 224a although the light is the linear polarization, a polarizer 225 is disposed in the light pulse incidence surface side of the liquid crystal retarder 224a. For example, the polarizer 225 is disposed in the light pulse incidence surface side of the intensity modulator 224, the position of the polarizer 225 is set so that the optical axis of the liquid crystal retarder 224a is tilted by 45 degrees with respect to the linear polarization, and the intensity modulator 224 and the polarizer 225 are integrated with the liquid crystal retarder 221. According to this configuration of the polarization modulating unit 22, although the position of the polarization modulating unit 22 is not accurately controlled with respect to the light source unit 21, it is possible to set the polarization direction and the optical axis of the liquid crystal retarder 224a or the like at a desired angle.

The optical unit 31 of the reception side communication apparatus 30 includes a non-polarization beam splitter 311, polarization beam splitters 312 and 315, and a ¼ wavelength plate 313. The non-polarization beam splitter 311 performs division without a change in the polarization state of the light pulse emitted from the transmission side communication apparatus 20. The polarization beam splitter 312 performs the polarization separation on the one of the light pulses split by the non-polarization beam splitter 311. With respect to the polarization state of the other light pulse spilt by the non-polarization beam splitter 311, the ¼ wavelength plate 313 converts the linear polarization to the circular polarization and converts the circular polarization to the linear polarization. The polarization beam splitter 315 performs the polarization separation on the light pulse of which the polarization state is changed by the ¼ wavelength plate 313.

The light-receiving unit 32 includes light-receiving devices 321H, 321V, 321R, and 321L. The light-receiving device 321H detects the one light pulse which is polarization-split by the polarization beam splitter 312, and the light-receiving device 321V detects the other light pulse which is polarization-split by the polarization beam splitter 312. Similarly, the light-receiving device 321R detects the one light pulse which is polarization-split by the polarization beam splitter 315, and the light-receiving device 321L detects the other light pulse which is polarization-split by the polarization beam splitter 315.

<5-2. Operations of Fourth Embodiment>

[Quantum Communication Operation]

In the quantum communication of the BB84 protocol combined with the decoy method, the transmission side communication apparatus 20 performs the following operations.

The controller 26 drives the semiconductor light-emitting device 211 of the light source unit 21 by the pulse current to generate the light pulse. The light pulse generated by the light source unit 21 is incident on the intensity modulator 224 of the polarization modulating unit 22. In addition, in the case where the polarizer 225 is installed, the light pulse is incident through the polarizer 225 on intensity modulator 224.

The liquid crystal retarder 224a of the intensity modulator 224 is controlled at random so that the phase difference a occurring in the polarization components along the FAST axis and the SLOW axis is one value among a plurality of predetermined values according to the arrival timing of the light pulse.

The light pulse passing through the liquid crystal retarder 224a is incident on the polarizer 224b. In the case where the phase difference a is 0 degrees, since the liquid crystal retarder 224a does not influence the polarization of the incident light pulse, the light pulse with the polarization state of the light pulse emitted from the liquid crystal retarder 224a, which is the linear polarization of the incidence time without a change, is incident on the polarizer 224b.

In the case where the light emitted from the light source unit 21 is the linear polarization, the polarization axis of the polarizer 224b is set to be directed to the direction perpendicular to the polarization direction; and in the case where the polarizer 225 is installed, the polarization axis of the polarizer 224b is set to be directed to the polarization axis of the polarizer 225. Therefore, in the phase difference $\alpha$ in the liquid crystal retarder 224a is 0 degrees, the light pulse may not pass through the polarizer 224b, and the intensity of the light pulse becomes zero.

In the case where the phase difference α is not 0 degrees, since the liquid crystal retarder 224a influences the polarization of the incident light pulse, the light pulse with the polarization state of the light pulse emitted from the liquid crystal retarder 224a, which is generally changed to, the elliptical polarization, is incident on the polarizer 224b.

Although the light pulse incident on the polarizer 224b is emitted as the linear polarization, the intensity of the light pulse emitted at this time is changed depending on the polarization state of the elliptical polarization at the incidence time, that is, the phase difference α. For example, if the phase difference α is 90 degrees, the light pulse passing through the liquid crystal retarder 3 becomes the circular polarization; and if the light pulse passes through the polarizer 224b, the intensity of the light pulse becomes ½ of the original intensity.

For example, if the phase difference α is 180 degrees, the light pulse passing through the liquid crystal retarder 3 becomes the linear polarization which is polarized in the direction perpendicular to the incident linear polarization, and since the light pulse passes through the polarizer 224b as it is, the intensity of the light pulse is not changed.

In other words, if the phase difference occurring in the polarization components along the FAST axis and the SLOW axis of the liquid crystal retarder 224a is set to α, the intensity modulator 224 which is configured with an optical system formed by combining the liquid crystal retarder 224a and the polarizer 224b changes the intensity of the incident light pulse to a product of $[\sin(\alpha/2)]^2$ thereof.

With respect to a plurality of predetermined values of the phase difference α, the average value of the number of photons including one light pulse after the passing through the intensity modulator 224 may be defined, for example, to be zero, one, or ten. The light pulse passing through the intensity modulator 224 is incident on the liquid crystal retarder 221. The liquid crystal retarder 221 performs the same operations as those of the first embodiment, and the light pulse of which the polarization state is controlled to be one of the four polarization states at random by the controller 26 is output from the transmission side communication apparatus 20.

The reception side communication apparatus 30 performs the same operations as those of the first embodiment.

[Classical Communication Operation]

Next, after the quantum communication of the BB84 protocol combined with the decoy method, the classical communication is performed. Similarly to the first embodiment, the transmission side communication apparatus 20 and the reception side communication apparatus 30 perform (1) the basis exchange, (3) the error correction, and (4) the privacy amplification by using the public communication line. In addition, (2) the estimation of the error rate is performed as follows.

(2) Estimation of Error Rate

In the case where the transmission side communication apparatus 20 transmits the light pulse which is the linear polarization (V or H) and the reception side communication apparatus 30 detects the linear polarization (V or H) or the case where the transmission side communication apparatus 20 transmits the light pulse which is the circular polarization (L or R) and the reception side communication apparatus 30 detects the circular polarization (L or R), about a half of the data are selected at random among the bit sequence obtained through the basis exchange. In addition, the error rate is estimated by combining the values by the transmission side communication apparatus 20 and the reception side communication apparatus 30.

At this time, with respect to each of the light pulses which are modulated with different intensities, the error rate is estimated by the intensity modulator 224 of the transmission side communication apparatus 20. For example, in the case where the average value of the number of photons included in one light pulse is set to be zero, one, and ten, the error rate of the pulse of which the average value of the number of photons is zero, the error rate of the pulse of which the average value of the number of photons is one, and the error rate of the pulse of which the average value of the number of photons is ten are estimated. The data used at this time are discarded. The error rate is a parameter which is necessary for (4) privacy amplification.

Since the error rate is estimated in the relation to each of the light pulses which have different average numbers of photons included, in the case where all errors are assumed to be caused by eavesdropping, it is difficult to estimate the mutual information amount leaked to the eavesdropper in comparison with the first embodiment. Therefore, if other conditions are the same, it is possible to generate much more common keys in comparison with the first embodiment.

In addition, in the fourth embodiment, the decoy method may be combined with the BB84 protocol using the polarization states of the four types of linear polarizations or the 6-state protocol using the polarization states of the four types of linear polarizations and the two types of circular polarizations.

In this manner, in the fourth embodiment, an intensity modulator 224 configured with, a liquid crystal retarder 224a and a polarizer 224b is disposed in the incidence surface side of the liquid crystal retarder 221. Therefore, the conversion of the intensity of the light pulse is performed by controlling the liquid crystal retarder 224a, and the conversion of the polarization state is performed by controlling the liquid crystal retarder 221, so that it is possible to further increase the encrypted intensity of the quantum key distribution. In other words, even in the case of using the decoy method, it is possible to easily miniaturize the communication apparatus and to mount it on a portable electronic apparatus or the like.

<6. Fifth Embodiment>

In the aforementioned first to fourth embodiments, the cases of performing the quantum encryption communication by using a free space as the quantum communication line 51 are described. In this manner, in the case where the free space is used as the quantum communication line 51, the position alignment is necessary so that the light pulse emitted from the transmission side communication apparatus 20 is correctly received by the reception side communication apparatus 30. However, if the optical fiber is used as the quantum communication line, the position alignment of the transmission side communication apparatus 20 and the reception side communication apparatus 30 is not necessary, so that it is possible to easily perform the quantum encryption communication. In a fifth embodiment, a case of using an optical fiber 52 as the quantum communication line is described.

In addition, in the fifth embodiment, a case of performing the quantum key distribution by using the decoy method in the BB84 protocol using the four types of polarization states including the two types of linear polarizations and the two types of circular polarizations is described.

<6-1. Configuration of Fifth Embodiment>

Figure 10:
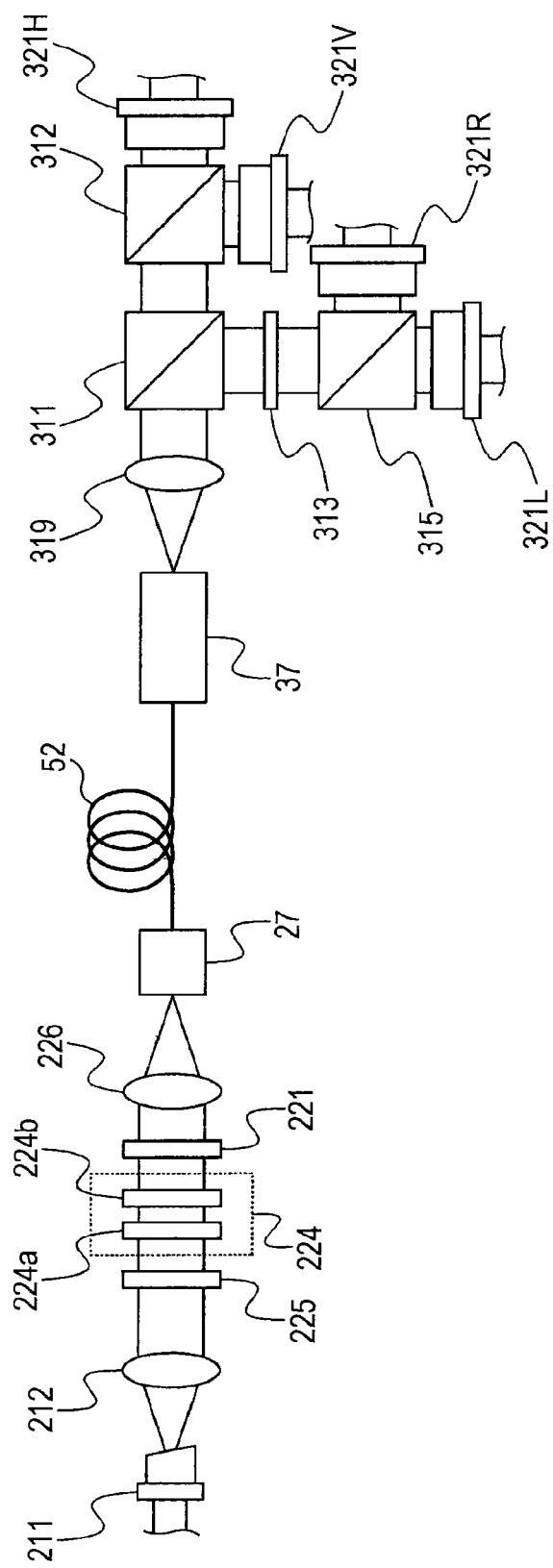
FIG. 10 is a diagram illustrating a configuration according to a fifth embodiment of the present disclosure.

FIG. 10 illustrates a configuration of the fifth embodiment. In addition, FIG. 10 illustrates the configuration of the light source unit 21, the polarization modulating unit 22, the optical unit 31, the light-receiving unit 32, and the like illustrated in FIG. 1.

The light source unit 21 of the transmission side communication apparatus 20 is configured by using a semiconductor light-emitting device 211 such as a laser diode or an LED and a lens 212 which collimates a light pulse emitted from the semiconductor light-emitting device 211.

The polarization modulating unit 22 includes a liquid crystal retarder 221 which converts the polarization state of the collimated light pulse to one of the four types of polarization states. The liquid crystal retarder 221 is disposed so that the optical axis is tilted by 45 degrees with respect to the polarization axis of the polarizer 224b of the later-described intensity modulator 224. The liquid crystal retarder 221 is controlled by the controller 26 to change the phase difference occurring in the polarization components along the FAST axis and the SLOW axis according to the voltage applied to the controller 26.

An intensity modulator 224 which performs the intensity modulation of the light pulse is disposed in the incidence surface side of the liquid crystal retarder 221. The intensity modulator 224 is configured by using a liquid crystal retarder 224a and a polarizer 224b. The liquid crystal retarder 224a is disposed so that the optical axis of the liquid crystal retarder 224a is tilted by 45 degrees with respect to the direction of the linear polarization of the incident light pulse. In the case where the light emitted from the light source unit 21 is the linear polarization, the polarization axis of the polarizer 224b is set to the direction perpendicular to the polarization direction.

The liquid crystal retarder 224a changes the phase difference occurring in the polarization components along the FAST axis and the SLOW axis according to the control signal of the controller 26. In this manner, the phase difference is changed, so that the intensity of the light pulse output through the polarizer 224b is adjusted.

The light pulse emitted from the liquid crystal retarder 221 is condensed by the lens 226 and incident on the optical fiber 52 connected to the optical fiber connector 27.

In addition, in the fifth embodiment, although the intensity modulator 224 is implemented with an optical system including the liquid crystal retarder 224a and the polarizer 224b, the intensity modulation may be performed by modulating a current value for driving the semiconductor light-emitting device 211. In addition, an optical intensity modulator using a non-linear optical crystal or the like may also be used.

In addition, in the polarization modulating unit 22, in the case where the light emitted from the light source unit 21 is not the linear polarization or the case where it is difficult to accurately control the polarization direction with respect to the optical axis of the liquid crystal retarder 224a although the light is the linear polarization, a polarizer 225 is disposed in the light pulse incidence surface side of the liquid crystal retarder 224a. For example, the polarizer 225 is disposed in the light pulse incidence surface side of the intensity modulator 224, the position of the polarizer 225 is set so that the optical axis of the liquid crystal retarder 224a is tilted by 45 degrees with respect to the linear polarization, and the intensity modulator 224 and the polarizer 225 are integrated with the liquid crystal retarder 221. According to this configuration of the polarization modulating unit 22, although the position of the polarization modulating unit 22 is not accurately controlled with respect to the light source unit 21, it is possible to set the polarization direction and the optical axis of the liquid crystal retarder 224a or the like at a desired angle.

The optical unit 31 of the reception side communication apparatus 30 includes a non-polarization beam splitter 311, polarization beam splitters 312 and 315, and a ¼ wavelength plate 313. In addition, the reception side communication apparatus 30 includes an automatic polarization controller 37 and a lens 319.

The non-polarization beam splitter 311 performs division without a change in the polarization state of the light pulse emitted from the transmission side communication apparatus 20. The polarization beam splitter 312 performs the polarization separation on the one of the light pulses split by the non-polarization beam splitter 311. With respect to the polarization state of the other light pulse spilt by the non-polarization beam splitter 311, the ¼ wavelength plate 313 converts the linear polarization to the circular polarization and converts the circular polarization to the linear polarization. The polarization beam splitter 315 performs the polarization separation on the light pulse of which the polarization state is changed by the ¼ wavelength plate 313.

The light-receiving unit 32 includes light-receiving devices 321H, 321V, 321R, and 321L. The light-receiving device 321H detects the one light pulse which is polarization-split by the polarization beam splitter 312, and the light-receiving device 321V detects the other light pulse which is polarization-split by the polarization beam splitter 312. Similarly, the light-receiving device 321R detects the one light pulse which is polarization-split by the polarization beam splitter 315, and the light-receiving device 321L detects the other light pulse which is polarization-split by the polarization beam splitter 315.

The automatic polarization controller 37 corrects the polarization state of the light pulse transmitted through the optical fiber 52. The lens 319 collimates the light pulse which passes through the automatic polarization controller 37 to be emitted from the optical fiber 52 and allows the light pulse to be incident on the non-polarization beam splitter 311.

In addition, in the fifth embodiment, an optical system which extracts the light pulse from the optical fiber 52 to a free space, after the light pulse passes through the automatic polarization controller 37, is illustrated. However, the optical system may be configured so that the non-polarization beam splitter, the polarization beam splitter, or the like is configured with optical fiber devices, so that the light pulse may not be extracted to a free space but it may be divided by the optical fiber.

<6-2. Operations of Fifth Embodiment>
[Quantum Communication Operation]

The controller 26 drives the semiconductor light-emitting device 211 of the light source unit 21 by the pulse current to generate the light pulse. The light pulse generated by the light source unit 21 is incident on the intensity modulator 224 of the polarization modulating unit 22. In addition, in the case where the polarizer 225 is installed, the light pulse is incident through the polarizer 225 on the intensity modulator 224.

The liquid crystal retarder 224a of the intensity modulator 224 is controlled at random so that the phase difference a occurring in the polarization components along the FAST axis and the SLOW axis is one value among a plurality of predetermined values according to the arrival timing of the light pulse. in the case where the light emitted from the light source unit 21 is the linear polarization, the polarization axis of the polarizer 224b is set to be directed to the direction perpendicular to the polarization direction; and in the case where the polarizer 225 is installed, the polarization axis of the polarizer 224b is set to be directed to the polarization axis of the polarizer 225. Therefore, the phase difference a in the liquid crystal retarder 224a is controlled to be a plurality of predetermined values by the controller 26, so that the light pulse passing through the intensity modulator 224 is the light pulse which the intensity modulation is performed on. The light pulse passing through the intensity modulator 224 is incident on the liquid crystal retarder 221. The liquid crystal retarder 221 performs the same operations as those of the first embodiment, and the light pulse of which the polarization state is controlled to be one of the four polarization states at random by the controller 26 is emitted to the lens 226.

The lens 226 condenses the light pulse emitted from the liquid crystal retarder 221 to be incident on the optical fiber 52 connected to the optical fiber connector 27.

The reception side communication apparatus 30 allows the non-polarization beam splitter 311 of the optical unit 31 to divide the light pulse collimated by the lens 319. The one of the light pulses split by the non-polarization beam splitter 311 is incident on the polarization beam splitter 312, divided into the polarization components, and incident on the light-receiving device 321H or the light-receiving device 321V.

The other of the light pulses split by the non-polarization beam splitter 311 passes through the ¼ wavelength plate 313 to allow the polarization state to be changed, and after that, incident on the polarization beam splitter 315, divided into the polarization components, and incident on the light-receiving device 321R or the light-receiving device 321L. By repetitively performing the above operations, the light reception results of the light-receiving devices 321V, 321H, 321L, and 321R are output to the controller 36.

In addition, the transmission side communication apparatus 20 and the reception side communication apparatus 30 perform operation setting of the automatic polarization controller 37 so that a change in the polarization state which inevitably occurs during the propagation of the light pulse through the optical fiber 52 is removed before the quantum encryption communication is performed. For example, at a predetermined timing, the transmission side communication apparatus 20 transmits the light pulse having a predetermined polarization state, and the reception side communication apparatus 30 detects the light pulse with the light-receiving device. The controller 36 controls the automatic polarization controller 37 based on the detection result of the light-receiving device so that the light pulse having a predetermined polarization state is detected by a predetermined light-receiving device. In other words, the automatic polarization controller 37 removes a change in the polarization state which occurs during the propagation of the light pulse.

[Classical Communication Operation]

After that, in the BB84 protocol combined with the decoy method, the portion which performs the classical communication is executed. Similarly to the fourth embodiment, the transmission side communication apparatus 20 and the reception side communication apparatus 30 perform (1) the basis exchange, (2) the estimation of the error rate, (3) the error correction, and (4) the privacy amplification by using the public communication line.

In addition, in the fifth embodiment, the decoy method may be combined with the BB84 protocol using the polarization states of the four types of linear polarizations or the 6-state protocol using the polarization states of the four types of linear polarizations and the two types of circular polarizations.

In this manner, in the fifth embodiment, the polarization modulating unit 22 is configured with the liquid crystal retarder 221, the intensity modulator 224, and the like, and the light pulse emitted from the polarization modulating unit 22 is configured so as to be incident on the optical fiber 52 through the lens 226. In this manner, even in the case where the optical fiber is used as the quantum communication line, since the quantum encryption communication apparatus or system may be miniaturized, it is possible to mount it on a portable apparatus. In addition, the optical fiber 52 is used as the quantum communication line, so that the position alignment of the transmission side communication apparatus and the reception side communication apparatus is unnecessary, and it is possible to easily perform the quantum encryption communication.

<7. State of Application to Electronic Apparatus>

Figure 11:
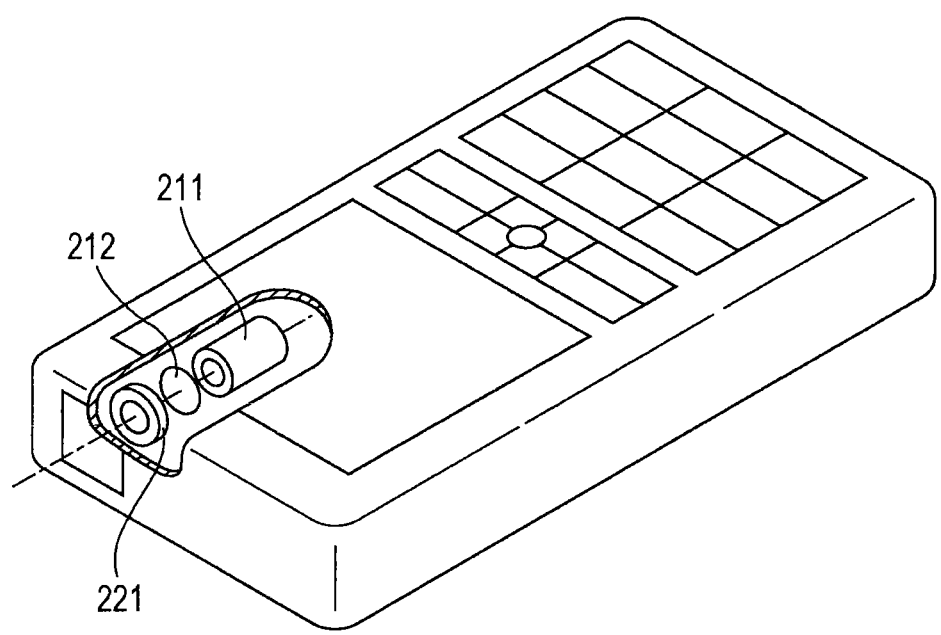
FIG. 11 is a diagram illustrating a state where a quantum encryption communication apparatus is assembled into a mobile phone.

Next, examples where the quantum encryption communication apparatus is applied to electronic apparatuses are described with reference to FIGS. 11 to 13. FIG. 11 illustrates an example of application to a mobile phone.

In the case where the quantum encryption communication apparatus is applied to the mobile phone, a semiconductor light-emitting device 211, a lens 212, and a liquid crystal retarder 221 are mounted. The light pulse emitted from the semiconductor light-emitting device 211 is condensed by the lens 212 so as to be incident on the liquid crystal retarder 221. Next, the liquid crystal retarder 221 performs the polarization modulation of the incident light pulse and emits the light pulse to an external portion of the mobile phone.

In this manner, the quantum encryption communication apparatus is configured so the polarization modulation is performed by using the liquid crystal retarder. Therefore, it is possible to miniaturize the quantum encryption communication apparatus, and as illustrated in this figure, it is possible to embed the quantum encryption communication apparatus in the mobile phone.

Figure 12:
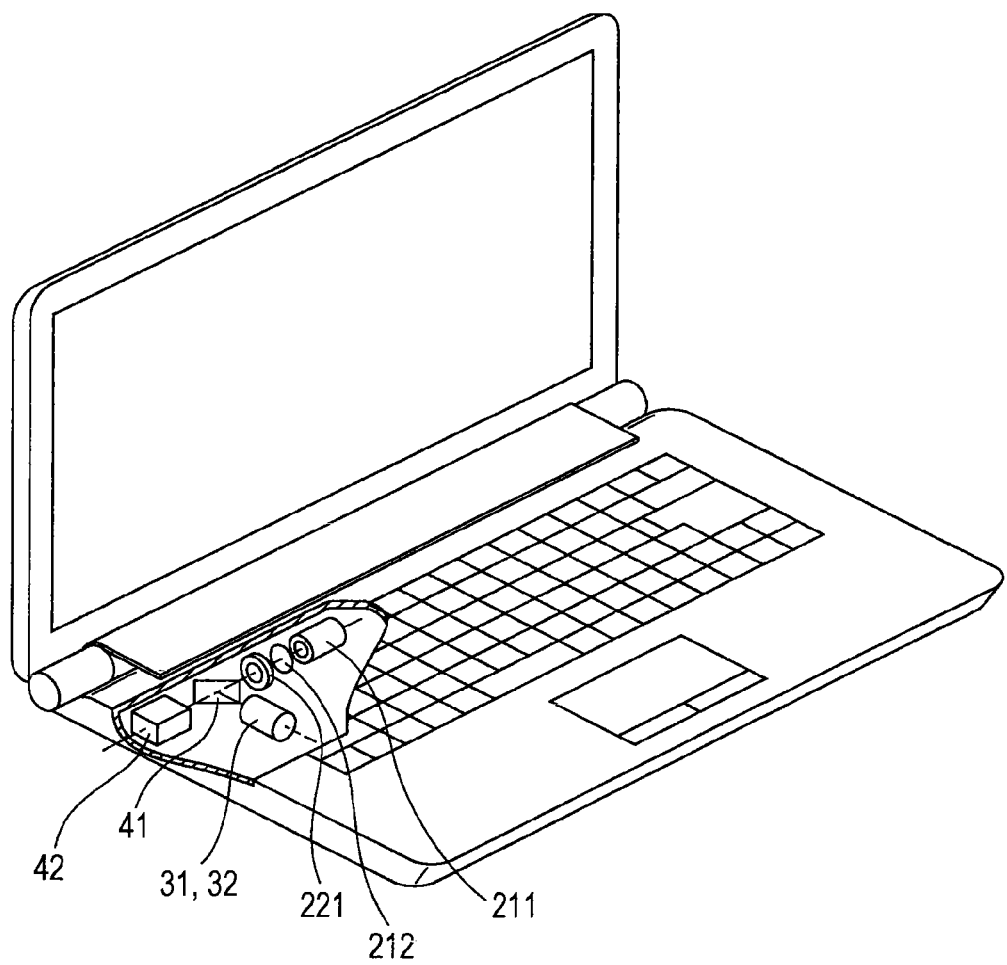
FIG. 12 is a diagram illustrating a state where a quantum encryption communication apparatus is assembled into a notebook type PC.
Figure 13:
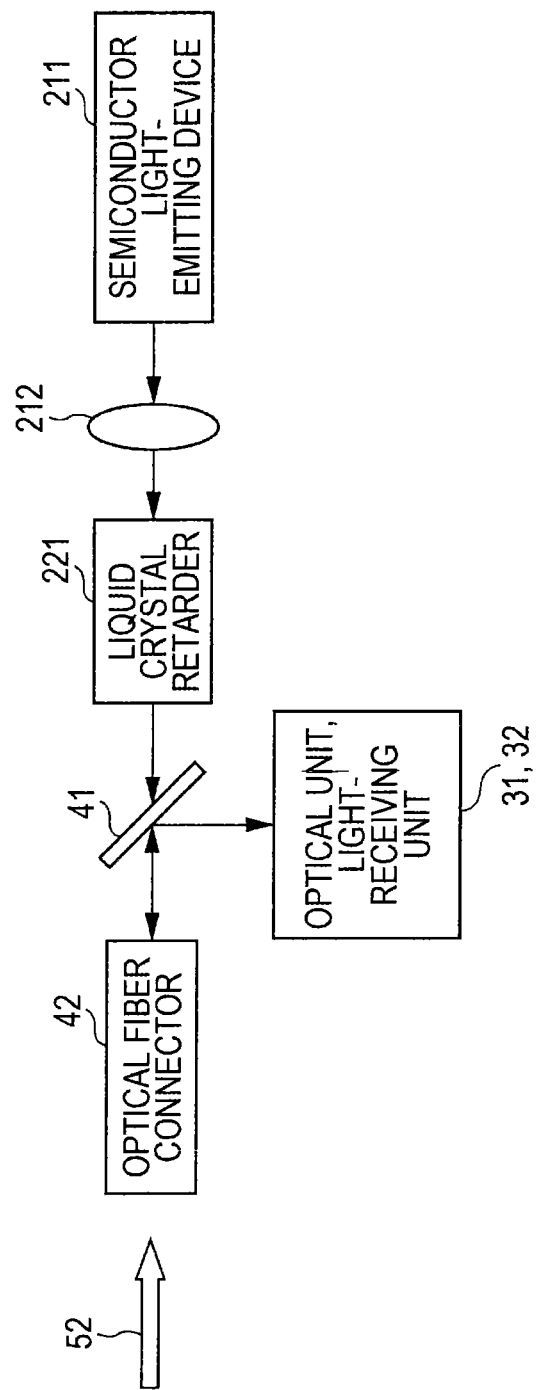
FIG. 13 is a diagram illustrating a configuration in a state where a quantum encryption communication apparatus is assembled into a notebook type PC.

FIGS. 12 and 13 illustrate examples of application to a notebook type computer. In the case of the application to the notebook type computer, for example, in the arrangement illustrated in FIG. 12, a semiconductor light-emitting device 211, a lens 212, a liquid crystal retarder 221, optical units 31 and 32, a filter 41, and an optical fiber connector 42 are disposed. The configuration of these parts disposed in the notebook type computer is the same as that of FIG. 13. The light pulse emitted from the semiconductor light-emitting device 211 is focused by the lens 212 so as to be incident on the liquid crystal retarder 221. Next, the liquid crystal retarder 221 performs the polarization modulation of the incident light pulse and allows, the polarization-modulated light pulse to be incident on the filter 41.

The filter 41 functions as a light separator which guides the light pulse output from the light source apparatus 1 to the optical fiber connector 42 and guides the light pulse which is input from an external portion through the optical fiber connector 42 to the optical unit 31. Therefore, the polarization-modulated light pulse is incident through the filter 41 on the optical fiber connector 42. The light pulse incident on the optical fiber connector 42 is extracted to an external portion through the optical cable connected to the optical fiber connector 42. On the other hand, the light pulse which is incident from an external portion through the optical cable connected to the optical fiber connector 42 is incident through the filter 41 on the optical unit 31. The optical unit 31 receives the incident light pulse. The optical unit 31 separates the received light pulse into the polarizations and outputs the polarizations to the light-receiving unit 32 which is configured by using a semiconductor light-receiving device, for example, a photodiode or the like.

In addition, herein, the situation where bi-directional communication is performed by using one optical cable has been considered. In general, in the bi-directional communication using the optical cable, the wavelengths of the light pulse used for the transmission and the wavelengths of the light pulses used for the reception are different from each other. Therefore, it is possible to separate the light pulses of which the wavelengths are different by using the aforementioned filter 41. According to a type or a form of communication functions mounted on the notebook type computer, the configurations of the filter 41, the optical fiber connector 42, the optical unit 31, and the light-receiving unit 32 may be appropriately modified. In addition, a partial change in design, for example, embedment of the lens 212 in the light source apparatus or the like is also permitted.

In this case, the quantum encryption communication apparatus is configured to perform the polarization modulation by using the liquid crystal retarder, so that it is possible to miniaturize the quantum encryption communication apparatus and to embed the quantum encryption communication apparatus in the notebook type computer as illustrated in the figure. In addition, since the size of the notebook type computer is larger than that of the mobile phone, it is possible to easily install the reception function as well as the transmission function of the quantum encryption communication. For example, as illustrated in the figure, an optical filter is installed to pass the polarization-modulated light pulse to a light connector socket side and to reflect the light pulse of the light connector socket side to the optical unit 31 side. According to this configuration, it is possible to install the transmission function and the reception function of the quantum encryption communication in the notebook type computer.

In addition, the present disclosure should not be construed to be limited to the aforementioned embodiments of the present disclosure. The embodiments of the present disclosure disclose the present disclosure in exemplary forms, and thus, it is obvious that various modifications or alterations of the embodiments may be made by those skilled in the art within the range not departing from the spirit of the present disclosure. In other words, the claims should be taken into consideration in order to determine the spirit of the present disclosure.

The present disclosure contains subject matter related to that disclosed in Japanese Priority Patent Application JP 2010-226628 filed in the Japan Patent Office on Oct. 6, 2010, the entire contents of which are hereby incorporated by reference.

What is claimed is:

1. A quantum encryption communication apparatus of a transmission side which performs a communication process with a receiving apparatus based on quantum encryption, comprising:
    a light source unit which generates a light pulse;
    a polarization modulating unit which performs polarization modulation of the light pulse by using a variable wavelength plate;
    a controller which drives the variable wavelength plate to convert a polarization state of the light pulse to one of a plurality of predetermined polarization bases at random by generating a random number and supplying the random number to the polarization modulating unit,
    wherein the controller drives the variable wavelength plate at random based on the generated random number so that a phase difference occurring in polarization components along a FAST axis and a SLOW axis is one of 0 degrees, 90 degrees, 180 degrees, and 270 degrees according to a time point of an arrival of the light pulse,
    wherein the polarization modulating unit emits the light pulse with the polarization state converted to the one of the plurality of polarization bases to the receiving apparatus; and
    a communication unit which receives from the receiving apparatus a detection result identifying the polarization state, of the emitted light pulse, detected in the receiving apparatus, wherein the polarization state includes at least one of:
        two types of linear polarizations and the two types of circular polarizations according to the Bennett-Brassard-84 (BB84) protocol;
        four types of linear polarizations according to the Bennett-Brassard-84 (BB84) protocol; and
        four types of linear polarizations and the two types of circular polarizations according to an extension of the Bennett-Brassard-84 (BB84) protocol.

2. The quantum encryption communication apparatus according to claim 1, wherein a liquid crystal retarder is used as the variable wavelength plate.

3. The quantum encryption communication apparatus according to claim 2, wherein a polarizer is integrally disposed in a light pulse incidence surface side of the liquid crystal retarder.

4. The quantum encryption communication apparatus according to claim 3, wherein a second liquid crystal retarder of which an optical axis is tilted by 45 degrees with respect to an optical axis of the liquid crystal retarder is disposed in an emitting surface side of the liquid crystal retarder.

5. The quantum encryption communication apparatus according to claim 3, wherein an intensity modulator is disposed between the polarizer and the liquid crystal retarder.

6. The quantum encryption communication apparatus according to claim 5, wherein the intensity modulator is configured with a liquid crystal retarder and a polarizer.

7. A quantum encryption communication method of a quantum encryption communication apparatus of a transmission side which performs a communication process with a receiving apparatus based on quantum encryption, comprising:
    generating, by a light source unit, a light pulse;
    performing polarization modulation of the light pulse by using a variable wavelength plate;
    driving, by a controller, the variable wavelength plate to convert a polarization state of the light pulse to one of a plurality of predetermined polarization bases at random by generating a random number and supplying the random number to the variable wavelength plate,
    emitting the light pulse with the polarization state converted to the one of the plurality of polarization bases to the receiving apparatus; and
    receiving, from the receiving apparatus, a detection result identifying the polarization state, of the emitted light pulse, detected in the receiving apparatus,
    wherein the driving includes driving the variable wavelength plate at random based on the generated random number so that a phase occurring in polarization components along a FAST axis and a SLOW axis is one of 0 degrees, 90 degrees, 180 degrees, and 270 degrees according to a time point of an arrival of the light pulse,
    wherein the polarization state includes at least one of:
        two types of linear polarizations and the two types of circular polarizations according to the Bennett-Brassard-84 (BB84) protocol;
        four types of linear polarizations according to the Bennett-Brassard-84 (BB84) protocol; and
        four types of linear polarizations and the two types of circular polarizations according to an extension of the Bennett-Brassard-84 (BB84) protocol.

8. A quantum encryption communication system which performs a communication process based on quantum encryption, the quantum encryption communication system including:
    a quantum encryption communication apparatus of a transmission side; and a quantum encryption communication apparatus of a reception side;

wherein the quantum encryption communication apparatus of the transmission side includes:

a light source unit which generates a light pulse;

a polarization modulating unit which performs polarization modulation of the light pulse by using a variable wavelength plate and emits the polarization-modulated light pulse to a communication line;

a controller which drives the variable wavelength plate to convert a polarization state of the light pulse to one of a plurality of predetermined polarization bases at random by generating a random number and supplying the random number to the polarization modulating unit, wherein the controller drives the variable wavelength plate at random based on the generated random number so that a phase difference occurring in polarization components along a FAST axis and a SLOW axis is one of 0 degrees, 90 degrees, 180 degrees, and 270 degrees according to a time point of an arrival of the light pulse, wherein the polarization modulating unit emits the light pulse with the polarization state converted to the one of the plurality of polarization bases to the quantum encryption communication apparatus of the reception side, and a communication unit which receives from the quantum encryption communication apparatus of the reception side a detection result identifying the polarization state, of the emitted light pulse, detected in the quantum encryption communication apparatus of the reception side, wherein the polarization state includes at least one of:

two types of linear polarizations and the two types of circular polarizations according to the Bennett-Brassard-84 (BB84) protocol;

four types of linear polarizations according to the Bennett-Brassard-84 (BB84) protocol; and four types of linear polarizations and the two types of circular polarizations according to an extension of the Bennett-Brassard-84 (BB84) protocol; and wherein the quantum encryption communication apparatus of the reception side includes:

an optical unit which distributes the light pulse emitted from the quantum encryption communication apparatus of the transmission side to each polarization basis; and a light-receiving unit which detects the light pulse, which is distributed to each of the polarization bases, with respect to each of the polarization bases, and detects the polarization state of the emitted light pulse received from the quantum encryption communication apparatus of the transmission side.

9. The quantum encryption communication apparatus according to claim 1, wherein if the phase difference is set to 0 degrees, the light pulse passing through the variable wavelength plate is vertically polarized.

10. The quantum encryption communication apparatus according to claim 1, wherein if the phase difference is set to 90 degrees, the light pulse passing through the variable wavelength plate is left-handed circular polarized.

11. The quantum encryption communication apparatus according to claim 1, wherein if the phase difference is set to 180 degrees, the light pulse passing through the variable wavelength plate is horizontally polarized.

12. The quantum encryption communication apparatus according to claim 1, wherein if the phase difference is set to 270 degrees, the light pulse passing through the variable wavelength plate is right-handed circular polarized.

13. The quantum encryption communication apparatus according to claim 1, further comprising:

a ¼ wavelength plate integrally disposed in a light pulse emitting surface side of the variable wavelength plate and tilted by 45 degrees with respect to an optical axis of the variable wavelength plate.

* * * * *